US010856200B2

(12) United States Patent
Zhang et al.

(10) Patent No.: US 10,856,200 B2
(45) Date of Patent: Dec. 1, 2020

(54) REPORTING CELL BAND INFORMATION IN A COMMUNICATION NETWORK

(71) Applicant: Huawei Technologies Co., Ltd., Shenzhen (CN)

(72) Inventors: Hongping Zhang, Shanghai (CN); Le Yan, Shanghai (CN); Xuehua Wang, Chengdu (CN); Mingzeng Dai, Shanghai (CN); Yi Guo, Shanghai (CN); Yilei Qin, Shanghai (CN); Xiongfei Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/720,739

(22) Filed: Sep. 29, 2017

(65) Prior Publication Data
US 2018/0027471 A1 Jan. 25, 2018

Related U.S. Application Data

(63) Continuation of application No. PCT/CN2016/081749, filed on May 11, 2016.

(30) Foreign Application Priority Data

Aug. 13, 2015 (CN) .......................... 2015 1 0496615

(51) Int. Cl.
*H04W 24/10* (2009.01)
*H04W 36/30* (2009.01)
(Continued)

(52) U.S. Cl.
CPC ........... *H04W 36/34* (2013.01); *H04W 24/10* (2013.01); *H04W 36/0061* (2013.01);
(Continued)

(58) Field of Classification Search
CPC . H04W 64/00; H04W 72/0453; H04W 24/10; H04W 36/0055; H04W 3/56;
(Continued)

(56) References Cited

U.S. PATENT DOCUMENTS 8,073,478 B2 * 12/2011 Hongchao ............... H04M 3/56
455/518
8,509,783 B2 * 8/2013 Iwamura ............... H04W 36/30
455/438
(Continued)

FOREIGN PATENT DOCUMENTS

CN 103067867 A 4/2013
CN 103733691 A 4/2014
(Continued)

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 13)," 3GPP TS 36.101, V13.0.0, pp. 1-699, 3rd Generation Partnership Project, Valbonne, France (Jul. 2015).
(Continued)

*Primary Examiner* — William D Cumming
(74) *Attorney, Agent, or Firm* — Huawei Technologies Co., Ltd.

(57) ABSTRACT

Embodiments of the present invention provide a communication method and a communications device. The method includes: sending, by a base station, a message including measurement configuration to UE, where the measurement configuration is used to request the UE to report a cell global identifier of a cell; obtaining, by the base station, a measurement report reported by the UE, where the measurement report corresponds to the measurement configuration and includes the cell global identifier of the cell and band information of the cell; and performing, by the base station,
(Continued)

cell handover based on the band information and the cell global identifier of the cell. By means of the present invention, the base station obtains complete and accurate band information of the cell, so that the base station can perform accurate handover decision, thereby avoiding handover failure.

8 Claims, 12 Drawing Sheets

(51) Int. Cl.
 H04W 24/08 (2009.01)
 H04W 36/34 (2009.01)
 H04W 36/00 (2009.01)
 H04W 92/20 (2009.01)

(52) U.S. Cl.
 CPC ....... *H04W 36/0083* (2013.01); *H04W 92/20* (2013.01); *H04W 36/0055* (2013.01); *H04W 36/0094* (2013.01)

(58) Field of Classification Search
 CPC . H04W 72/10; H04W 48/18; H04W 76/0061; H04W 36/30; H04W 36/0016; H04W 36/0083; H04W 16/19; H04W 24/08
 USPC .... 455/456.1, 436, 411, 416, 438, 437, 419; 379/202.01; 370/329, 331, 242
 See application file for complete search history.

(56) References Cited

U.S. PATENT DOCUMENTS

| | | | | |
|---|---|---|---|---|
| 9,020,488 B2* | 4/2015 | Axell | ................... | H04W 24/10 455/419 |
| 9,380,594 B1* | 6/2016 | Malmirchegini | ..... | H04W 24/08 |
| 9,438,406 B1* | 9/2016 | Vivanco | ................ | H04W 40/12 |
| 9,888,478 B2* | 2/2018 | Kim | ................... | H04L 5/0007 |
| 10,321,348 B2* | 6/2019 | Hayashi | ................. | H04B 17/24 |
| 10,652,790 B2* | 5/2020 | Lu | .......................... | H04W 24/10 |
| 2009/0154679 A1* | 6/2009 | Hongchao | ............... | H04M 3/56 379/202.01 |
| 2009/0213809 A1* | 8/2009 | Kwon | ................ | H04W 36/0061 370/331 |
| 2009/0275333 A1 | 11/2009 | Ishii et al. | | |
| 2011/0092214 A1* | 4/2011 | Iwamura | ................ | H04W 24/10 455/438 |
| 2013/0035085 A1* | 2/2013 | Axell | ................... | H04W 24/10 455/419 |
| 2013/0039342 A1 | 2/2013 | Kazmi | | |
| 2014/0120921 A1* | 5/2014 | Keskitalo | .......... | H04W 36/0016 455/438 |
| 2014/0235271 A1* | 8/2014 | Jung | ..................... | H04W 64/00 455/456.1 |
| 2014/0302821 A1* | 10/2014 | Hwang | ............. | H04W 36/0055 455/411 |
| 2014/0357277 A1* | 12/2014 | Asplund | ........... | H04W 36/0083 455/437 |
| 2015/0139183 A1* | 5/2015 | Pradas | .............. | H04W 36/0005 370/331 |
| 2015/0201337 A1 | 7/2015 | Hwang et al. | | |
| 2015/0305041 A1* | 10/2015 | Kim | ....................... | H04L 5/0037 370/329 |
| 2015/0312005 A1* | 10/2015 | Huang | .............. | H04W 72/0453 370/280 |
| 2015/0327269 A1* | 11/2015 | Kim | .................. | H04W 72/0453 370/329 |
| 2016/0021561 A1* | 1/2016 | Wang | ..................... | H04W 76/19 370/242 |
| 2016/0286414 A1* | 9/2016 | Zhou | ..................... | H04W 24/10 |
| 2017/0013490 A1* | 1/2017 | Lunttila | ............ | H04W 52/0206 |
| 2018/0027471 A1* | 1/2018 | Zhang | ............... | H04W 36/0061 455/436 |
| 2018/0160420 A1* | 6/2018 | Kim | ....................... | H04L 5/0007 |
| 2018/0206138 A1* | 7/2018 | Hayashi | ................. | H04B 17/24 |
| 2018/0227838 A1* | 8/2018 | Hayashi | .............. | H04W 72/042 |
| 2019/0182729 A1* | 6/2019 | Lu | ..................... | H04W 36/0094 |
| 2019/0215742 A1* | 7/2019 | Lu | .......................... | H04W 36/14 |

FOREIGN PATENT DOCUMENTS

| | | |
|---|---|---|
| CN | 103858482 A | 6/2014 |
| JP | 2014220766 A | 11/2014 |
| JP | 2016519498 A | 6/2016 |
| JP | 2017507624 A | 3/2017 |
| RU | 2008136541 A | 3/2010 |
| WO | 2014161678 A1 | 10/2014 |
| WO | 2015107102 A1 | 7/2015 |

OTHER PUBLICATIONS

"3rd Generation Partnership Project; Technical Specification Group Services and System Aspects; 3GPP System Architecture Evolution (SAE); Security architecture (Release 12)," 3GPP TS 33.401, V12.14.0, pp. 1-131, 3rd Generation Partnership Project, Valbonne, France (Mar. 2015).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.2.0, pp. 1-365, 3rd Generation Partnership Project, Valbonne, France (Jun. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.6.0, pp. 1-449, 3rd Generation Partnership Project, Valbonne, France (Jun. 2015).

"3rd Generation Partnership Project; Technical Specification Group Radio Access Network; Evolved Universal Terrestrial Radio Access Network (E-UTRAN); X2 application protocol (X2AP) (Release 13)," 3GPP TS 36.423, V13.0.0, pp. 1-209, 3rd Generation Partnership Project, Valbonne, France (Jun. 2015).

"ANR in case of MFBI," 3GPP TSG-RAN WG2 Meeting #91 Beijing, China, R2-153796, 3rd Generation Partnership Project, Valbonne, France (Aug. 24-28, 2015).

"Discussion on neighbour cell multiband capability update process," 3GPP TSG RAN WG3 Meeting #77bis, Lecce, Italy, R3-122164, 3rd Generation Partnership Project, Valbonne, France (Oct. 8-12, 2012).

* cited by examiner

REPORTING CELL BAND INFORMATION IN A COMMUNICATION NETWORK

CROSS-REFERENCE TO RELATED APPLICATIONS

This application is a continuation of International Application No. PCT/CN2016/081749, filed on May 11, 2016, which claims priority to Chinese Patent Application No. 201510496615.2, filed on Aug. 13, 2015. The disclosures of the aforementioned applications are hereby incorporated by reference in their entireties.

TECHNICAL FIELD

Embodiments of the present invention relate to the field of communications technologies, and in particular, to a communication method and a communications device.

BACKGROUND

In order to ensure better communication quality, a network side device needs to configure a neighboring cell for user equipment (UE), so that when cell handover needs to be performed, the UE is handed over to the neighboring cell. Currently, using a Long Term Evolution (LTE) communications system as an example, a base station usually configures a neighboring cell by using an automatic neighbor relation (ANR) mechanism, and stores related information of the configured neighboring cell.

An implementation process of configuring the neighboring cell by using the ANR mechanism is that: the base station instructs the UE to measure a particular absolute radio frequency channel number (ARFCN); the UE recognizes a new cell according to a physical frequency indicated by the ARFCN, and reports a physical cell identifier (PCI) of the recognized new cell to the base station; if determining that the cell corresponding to the PCI is a newly recognized neighboring cell, the base station delivers a measurement task of measurement configuration (reportCGI), and requires the UE to report a cell global identifier (CGI) of the neighboring cell, where a central physical frequency of the reported neighboring cell is the physical frequency indicated by the ARFCN, and a cell ID is a PCI value; the UE reads system information of a cell whose central physical frequency is the physical frequency indicated by the ARFCN and whose cell ID is the PCI value, obtains the CGI of the neighboring cell, and reports the CGI to the base station; and the base station adds the cell whose central physical frequency is the physical frequency indicated by the ARFCN and whose cell ID is the PCI value as a neighboring cell, associates the CGI with the ARFCN and the PCI, and stores the CGI, the ARFCN, and the PCI as information about the added neighboring cell.

Currently, the neighboring cell configured by using the foregoing ANR mechanism is used as a target cell. When cell handover is performed, handover failure often occurs, and how to resolve handover failure is a problem to be urgently resolved in the industry.

SUMMARY

Embodiments of the present invention provide a communication method and a communications device, so as to improve a success rate of cell handover.

According to a first aspect, a communication method is provided, including:

sending, by a first base station, a message including measurement configuration to user equipment, where the measurement configuration is used to request the user equipment to report a cell global identifier of a cell;

obtaining, by the first base station, a measurement report that is reported by the user equipment and that corresponds to the measurement configuration, where the measurement report includes the cell global identifier of the cell and band information of the cell; and performing, by the first base station, cell handover based on the band information of the cell and the cell global identifier of the cell.

With reference to the first aspect, in a first implementation manner, if one band is configured for the cell, the band information includes the band configured for the cell; and if at least two bands are configured for the cell, the band information includes a band configured for the cell and an additional band list configured for the cell, where the additional band list is used to store another band except the band configured for the cell.

With reference to the first implementation manner of the first aspect, in a second implementation manner, if at least two bands are configured for the cell, the measurement report further includes band priority information of the cell; and the band priority information is used to indicate whether a priority of the band in the additional band list configured for the cell is higher than priority of the band configured for the cell.

With reference to the first aspect, or the first implementation manner of the first aspect, or the second implementation manner of the first aspect, in a third implementation manner, before the obtaining, by the first base station, a measurement report that is reported by the user equipment, the method further includes:

sending, by the first base station, indication information, where the indication information is used to instruct the user equipment to report the band information of the cell.

With reference to the third implementation manner of the first aspect, in a fourth implementation manner, before the sending, by the first base station, indication information, the method further includes:

obtaining capability information reported by the user equipment, where the capability information is used to indicate whether the user equipment supports reporting of the band information of the cell; and determining, according to the capability information, that the user equipment supports reporting of the band information of the cell.

With reference to the third implementation manner of the first aspect or the fourth implementation manner of the first aspect, in a fifth implementation manner, the indication information is included in the message.

With reference to any one of the first aspect or the foregoing implementation manners of the first aspect, in a sixth implementation manner, the message is a radio resource control RRC connection reconfiguration message.

With reference to the first aspect, in a seventh implementation manner, the method further includes:

when handover is performed by using an X2 interface, selecting, by the first base station, a downlink absolute radio frequency channel number ARFCN for the user equipment based on the band information of the cell, where the cell belongs to a second base station; and deriving, by the first base station, a key based on the downlink ARFCN and sending the key to the second base station.

With reference to the second implementation manner of the first aspect, in an eighth implementation manner, the method further includes:

when handover is performed by using an X2 interface, selecting, by the first base station, a downlink absolute radio frequency channel number ARFCN for the user equipment based on the band information and the band priority information of the cell, where the cell belongs to a second base station; and deriving, by the first base station, a key based on the downlink ARFCN and sending the key to the second base station.

According to a second aspect, a communication method is provided, including:

obtaining, by a first base station, band priority information of a cell of a second base station, where the band priority information is used to indicate whether a priority of a band in an additional band list configured for the cell is higher than priority of band configured for the cell, and the additional band list is used to store another band except the band configured for the cell;

when handover is performed by using an X2 interface, selecting, by the first base station, a downlink absolute radio frequency channel number ARFCN for user equipment based on the band priority information of the cell; and deriving, by the first base station, a key based on the downlink ARFCN and sending the key to the second base station.

With reference to the second aspect, in a first implementation manner, the obtaining, by a first base station, band priority information of a cell of a second base station includes:

receiving, by the first base station, response information, sent by the second base station, of an X2 setup request message, where the response information includes the band priority information of the cell.

With reference to the second aspect, in a second implementation manner, the obtaining, by a first base station, band priority information of a cell of a second base station includes:

receiving, by the first base station, an X2 setup request message sent by the second base station, where the X2 setup request message includes the band priority information of the cell.

According to a third aspect, a communication method is provided, including:

receiving, by user equipment, a message that is sent by a first base station and that includes measurement configuration, where the measurement configuration is used to request the user equipment to report a cell global identifier of a cell;

obtaining, by the user equipment, the cell global identifier of the cell and band information of the cell, and generating a measurement report corresponding to the measurement configuration; and reporting, by the user equipment, the measurement report, where the measurement report includes the cell global identifier of the cell and the band information of the cell.

With reference to the third aspect, in a first implementation manner, if one band is configured for the cell, the band information includes the band configured for the cell; and if at least two bands are configured for the cell, the band information includes a band configured for the cell and an additional band list configured for the cell, where the additional band list is used to store another band except the band configured for the cell.

With reference to the first implementation manner of the third aspect, in a second implementation manner, if at least two bands are configured for the cell, the measurement report further includes band priority information of the cell; and the band priority information is used to indicate whether a priority of the band in the additional band list configured for the cell is higher than priority of the band configured for the cell.

With reference to the third aspect, or the first implementation manner of the third aspect, or the second implementation manner of the third aspect, in a third implementation manner, before the obtaining, by the user equipment, band information of the cell, the method further includes:

receiving, by the user equipment, indication information sent by the first base station, where the indication information is used to instruct the user equipment to report the band information of the cell.

With reference to the third implementation manner of the third aspect, in a fourth implementation manner, a first indication message is included in the message.

With reference to any one of the third aspect or the foregoing implementation manners of the third aspect, in a fifth implementation manner, the method further includes:

reporting, by the user equipment, capability information, where the capability information is used to indicate whether the user equipment supports reporting of the band information of the cell.

With reference to any one of the third aspect or the foregoing implementation manners of the third aspect, in a sixth implementation manner, the message is a radio resource control RRC connection reconfiguration message.

According to a fourth aspect, a base station is provided, including:

a sending unit, configured to send a message including measurement configuration to user equipment, where the measurement configuration is used to request the user equipment to report a cell global identifier of a cell;

an obtaining unit, configured to obtain a measurement report that is reported by the user equipment and that corresponds to the measurement configuration, where the measurement report includes the cell global identifier of the cell and band information of the cell; and a control unit, configured to perform cell handover based on the cell global identifier of the cell and the band information of the cell that are obtained by the obtaining unit.

With reference to the fourth aspect, in a first implementation manner, if one band is configured for the cell, the band information includes the band configured for the cell; and if at least two bands are configured for the cell, the band information includes a band configured for the cell and an additional band list configured for the cell, where the additional band list is used to store another band except the band configured for the cell.

With reference to the first implementation manner of the fourth aspect, in a second implementation manner, if at least two bands are configured for the cell, the measurement report further includes band priority information of the cell; and the band priority information is used to indicate whether a priority of the band in the additional band list configured for the cell is higher than priority of the band configured for the cell.

With reference to the fourth aspect, or the first implementation manner of the fourth aspect, or the second implementation manner of the fourth aspect, in a third implementation manner, the sending unit is further configured to:

before the obtaining unit obtains the measurement report reported by the user equipment, send indication information, where the indication information is used to instruct the user equipment to report the band information of the cell.

With reference to the third implementation manner of the fourth aspect, in a fourth implementation manner, the obtaining unit is further configured to:

before the sending unit sends the indication information, obtain capability information reported by the user equipment, and determine, according to the capability information, that the user equipment supports reporting of the band information of the cell, where the capability information is used to indicate whether the user equipment supports reporting of the band information of the cell.

With reference to the third implementation manner of the fourth aspect or the fourth implementation manner of the fourth aspect, in a fifth implementation manner, the indication information is included in the message.

With reference to any one of the fourth aspect or the foregoing implementation manners of the fourth aspect, in a sixth implementation manner, the message is a radio resource control RRC connection reconfiguration message.

With reference to the fourth aspect, in a seventh implementation manner, the control unit is further configured to:

when handover is performed by using an X2 interface, select a downlink absolute radio frequency channel number ARFCN for the user equipment based on the band information of the cell, derive a key based on the downlink ARFCN, and send the key to a second base station, where the cell belongs to the second base station.

With reference to the second implementation manner of the fourth aspect, in an eighth implementation manner, the control unit is further configured to:

when handover is performed by using an X2 interface, select a downlink absolute radio frequency channel number ARFCN for the user equipment based on the band information and the band priority information of the cell, derive a key based on the downlink ARFCN, and send the key to a second base station, where the cell belongs to the second base station.

According to a fifth aspect, a base station is provided, including:

an obtaining unit, configured to obtain band priority information of a cell of a second base station, where the band priority information is used to indicate whether a priority of a band in an additional band list configured for the cell is higher than priority of band configured for the cell, and the additional band list is used to store another band except the band configured for the cell;

a selection unit, configured to: when handover is performed by using an X2 interface, select a downlink absolute radio frequency channel number ARFCN for user equipment based on the band priority information of the cell; and a sending unit, configured to derive a key based on the downlink ARFCN selected by the selection unit and send the key to the second base station.

With reference to the fifth aspect, in a first implementation manner, the obtaining unit is specifically configured to obtain the band priority information of the cell of the second base station in the following manner:

receiving response information, sent by the second base station, of an X2 setup request message, where the response information includes the band priority information of the cell.

With reference to the fifth aspect, in a second implementation manner, the obtaining unit is specifically configured to obtain the band priority information of the cell of the second base station in the following manner:

receiving an X2 setup request message sent by the second base station, where the X2 setup request message includes the band priority information of the cell.

According to a sixth aspect, user equipment is provided, including:

a receiving unit, configured to receive a message that is sent by a first base station and that includes measurement configuration, where the measurement configuration is used to request the user equipment to report a cell global identifier of a cell;

a generation unit, configured to obtain the cell global identifier of the cell and band information of the cell, and generate a measurement report corresponding to the measurement configuration received by the receiving unit; and a reporting unit, configured to report the measurement report generated by the generation unit, where the measurement report includes the cell global identifier of the cell and the band information of the cell.

With reference to the sixth aspect, in a first implementation manner, if one band is configured for the cell, the band information includes the band configured for the cell; and if at least two bands are configured for the cell, the band information includes a band configured for the cell and an additional band list configured for the cell, where the additional band list is used to store another band except the band configured for the cell.

With reference to the first implementation manner of the sixth aspect, in a second implementation manner, if at least two bands are configured for the cell, the measurement report further includes band priority information of the cell; and the band priority information is used to indicate whether a priority of the band in the additional band list configured for the cell is higher than priority of the band configured for the cell.

With reference to the sixth aspect, or the first implementation manner of the sixth aspect, or the second implementation manner of the sixth aspect, in a third implementation manner, the receiving unit is further configured to:

before the generation unit obtains the band information of the cell, receive indication information sent by the first base station, where the indication information is used to instruct the user equipment to report the band information of the cell.

With reference to the third implementation manner of the sixth aspect, in a fourth implementation manner, the indication message is included in the message.

With reference to any one of the sixth aspect or the foregoing implementation manners of the sixth aspect, in a fifth implementation manner, the reporting unit is further configured to:

report capability information, where the capability information is used to indicate whether the user equipment supports reporting of the band information of the cell.

With reference to any one of the sixth aspect or the foregoing implementation manners of the sixth aspect, in a sixth implementation manner, the message is a radio resource control RRC connection reconfiguration message.

In the communication method and the communications device that are provided in the embodiments of the present invention, a base station sends a message including measurement configuration to UE, and the base station performs measurement, and obtains band information of a cell, or band information and band priority information of a cell, so that the base station stores complete and accurate band information of the cell. Therefore, the base station can perform accurate handover decision, thereby avoiding handover failure.

DESCRIPTION OF EMBODIMENTS

Figure 1:
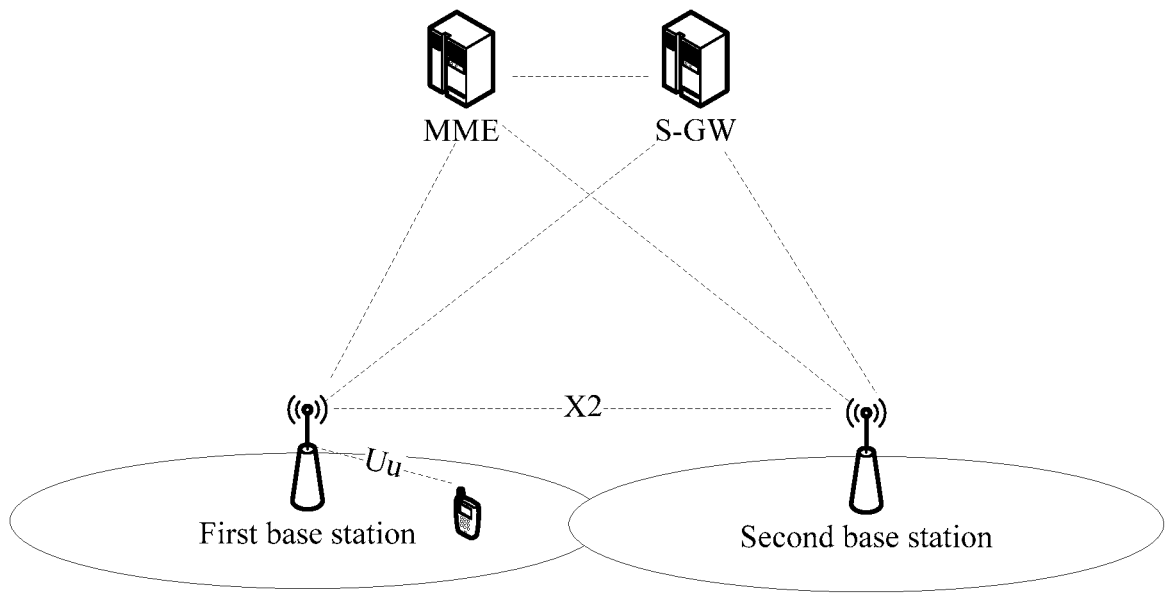
FIG. 1 is a communications architecture of an application of a communication method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System of Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), Universal Mobile Telecommunications System (UMTS), and a Worldwide Interoperability for Microwave Access (WiMAX) communications system.

It should also be understood that in the embodiments of the present invention, user equipment (UE) may be referred to as a terminal (Terminal), a mobile station (MS), a mobile terminal, and the like. The user equipment may communicate with one or more core networks by means of a radio access network (RAN). For example, the user equipment may be a mobile phone (also referred to as a cellular phone) or a computer with a mobile terminal. For example, the user equipment may also be a portable, pocket-sized, handheld, computer built-in, or in-vehicle mobile apparatus, which exchanges voice and/or data with the radio access network.

It should also be understood that in the embodiments of the present invention, a base station may be a base station (Base Transceiver Station, BTS for short) in the GSM or CDMA, or may be a base station (NodeB) in the WCDMA, or may be an evolved NodeB (evolved Node B, eNB, or e-NodeB for short) in the LTE, which is not limited in the present invention.

In a radio spectrum resource, physical frequencies of different bands (band) may overlap, that is, one physical frequency may belong to different bands. Each band includes several channels (channel), and each channel corresponds to one ARFCN (in an LTE system, an ARFCN may also be referred to as an EAFRCN. Herein, for the convenience of description, the ARFCN and the EAFRCN are not distinguished, the ARFCN is used for description, and this is not limited in the present invention). Therefore, one ARFCN indicates one physical frequency and one band. However, the physical frequency indicated by the ARFCN may correspond to one or more bands. Currently, during an implementation process of configuring a neighboring cell by using an ANR mechanism, when the physical frequency indicated by the ARFCN belongs to more than one band, UE reports a CGI of one cell according to the physical frequency indicated by the ARFCN. A base station associates the CGI with the ARFCN and a PCI, and stores the CGI, the ARFCN, and the PCI as information about the added neighboring cell. In this way, the stored information about the neighboring cell may be incorrect or incomplete. For example, an ARFCN measured under the instruction of the base station is equal to 5790, a physical frequency indicated by the ARFCN=5790 is 740 MHz, and a cell having a physical frequency of 740 MHz belongs to an overlapping physical frequency of a band 12 and a band 17. However, the base station instructs to measure the band 17, and band information of the neighboring cell stored by the base station is the band 17. Therefore, the following two scenarios may exist:

Scenario 1: If the neighboring cell belongs to the band 12, the base station stores incorrect band information.

Scenario 2: If the neighboring cell belongs to the band 12 and the band 17, the base station stores incomplete band information.

When performing cell handover, the UE performs handover decision according to the information about the neighboring cell stored by the base station. Because the base station stores incorrect or incomplete information about the neighboring cell, inevitably, the UE may perform incorrect handover decision, and cannot normally implement cell handover. For example, different bands define different performance indicators. The UE may support the band 17, but does not support the band 12. In scenario 1, the base station incorrectly considers that the UE can be handed over to a neighboring cell. When the UE is handed over to the neighboring cell, because the UE does not support a band of the neighboring cell, handover fails.

In scenario 2, if the UE supports only the band 12 and does not support the band 17, the base station incorrectly considers that the UE cannot be handed over to the neighboring cell, and stops the handover that should be performed. Therefore, a service of a user may be affected.

An embodiment of the present invention provides a communication method, so that the base station stores correct and complete band information, thereby avoiding a problem such as handover failure.

The communication method and the communications device that are provided in the embodiments of the present invention may be applied to a communications architecture shown in FIG. 1. In FIG. 1, an interface between a first base station and a second base station is referred to as an X2 interface, and the first base station and the second base station may exchange information of respective cells by means of an X2 interface setup process. An interface between a base station and UE is a Uu interface, that is, an air interface. The base station and the UE communicate with each other by using the air interface, such as an interface between the first base station and the UE in FIG. 1. The first base station and the second base station may also communicate with a mobility management entity (Mobility Management Entity, MME) and a serving gateway (Serving Gateway, S-GW), and details are not described in this embodiment of the present invention.

Figure 2A:
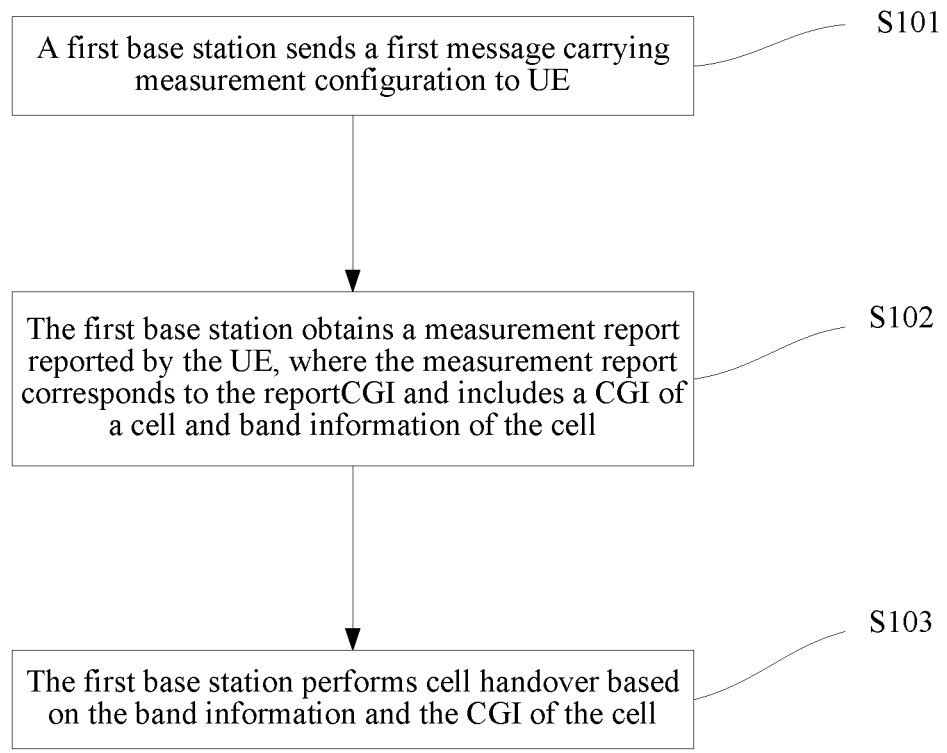
FIG. 2A to FIG. 2C are an implementation flowchart of a communication method according to an embodiment of the present invention.

FIG. 2A is an implementation flowchart of a communication method according to an embodiment of the present invention. The method shown in FIG. 2A is executed by a base station, and for the convenience of description, the base station is referred to as a first base station in this embodiment of the present invention. As shown in FIG. 2A, the method includes:

S101: A first base station sends a message including measurement configuration to UE.

In this embodiment of the present invention, the measurement configuration is used to request the UE to report a cell global identifier of a designated cell, and the designated cell, for example, may be a cell that is recognized by the first base station and that is to be used as a neighboring cell. It should be noted that the cell global identifier involved in this embodiment of the present invention may be a CGI, or may be an evolved-universal mobile telecommunications system terrestrial radio access network cell global identifier (E-UTRAN Cell Global Identifier, ECGI), and this is not limited in this embodiment of the present invention. This embodiment of the present invention is described by using an example in which the UE is requested to report the CGI of the designated cell. In this way, the measurement configuration may be configured as: measuring and reporting the cell global identifier (reportCGI). That is, this embodiment of the present invention is described by using an example in which the measurement configuration is the reportCGI.

In this embodiment of the present invention, the message sent by the first base station to the UE may be a radio resource control (Radio Resource Control, RRC) message. Optionally, the message in this embodiment of the present invention may be an RRC connection reconfiguration message.

S102: The first base station obtains a measurement report reported by the UE.

In this embodiment of the present invention, after receiving the message that is sent by the first base station and that includes the reportCGI, the UE performs measurement, obtains a CGI of a cell indicated by the first base station, reads system information of the cell, obtains band information of the cell, and generates the measurement report. The measurement report corresponds to the reportCGI and includes the CGI of the cell and the band information of the cell.

In this embodiment of the present invention, the band information of the cell obtained by the first base station may be as follows:

A: If one band is configured for the cell, the band information includes the band configured for the cell. The band configured for the cell is carried in a band indicator (freqBandIndicator) information element in the system message.

B: If at least two bands are configured for the cell, the band information includes the band configured for the cell and an additional band list configured for the cell. The additional band list configured for the cell is used to store information about another band except the band configured for the cell. The information about the band configured for the cell is carried in a freqBandIndicator information element in the system message. The additional band list configured for the cell is carried in a multiband indicator (multiBandInfoList) information element when a physical frequency of the cell belongs to more than one band.

It should be noted that in the present invention, a band carried in the freqBandIndicator information element is referred to as a configured band. Except the configured band, other bands are carried in the multiBandInfoList information element. In the present invention, the band carried in the multiBandInfoList information element is referred to as a configured additional band list. UE in an earlier version can recognize only the freqBandIndicator information element, and cannot recognize the multiBandInfoList information element. When an operator sets a cell for which multiple bands are configured, which band is carried in the freqBandIndicator depends on a policy of the operator.

In an earlier communications version, only one band can be configured for one cell, that is, the band is carried in a freqBandIndicator information element. In the present invention, the band carried in the freqBandIndicator information element is referred to as a configured band. In a later communications version, more than one band can be configured for one cell. Except an originally configured band, other bands are carried in a multiBandInfoList information element. In the present invention, the band carried in the multiBandInfoList information element is referred to as a configured additional band list. In the earlier communications version, UE can recognize only the freqBandIndicator information element, and cannot recognize the multiBandInfoList information element. When an operator sets a cell for which multiple bands are configured, which band is carried in the freqBandIndicator depends on a policy of the operator.

Optionally, in this embodiment of the present invention, if at least two bands are configured for the cell, that is, the multiBandInfoList information element is broadcast and band priority information is broadcast in the system information of the cell, the measurement report may include the band priority information, and the band priority information is used to indicate whether a priority of the band in the additional band list configured for the cell is higher than priority of the band configured for the cell. The band priority information is carried in a band priority indicator (freqBandIndicator) information element.

S103: The first base station performs cell handover based on band information and a CGI of the cell.

In this embodiment of the present invention, the first base station may store the band information of the cell, that is, the first base station stores complete and accurate band information of the cell. If a cell is used as a neighboring cell by using an ANR mechanism, when the cell is subsequently used as a target cell for cell handover, the first base station may perform cell handover based on a capability of the UE and the stored complete and accurate information of the neighboring cell.

In this embodiment of the present invention, the first base station may perform cell handover decision based on the stored band information of the neighboring cell, that is, determine whether the UE can be handed over to the cell that is used as the target cell. The following method may be used to determine whether the UE can be handed over to the cell that is used as the target cell: If the UE supports one band in the band information of the cell, it is considered that the UE can be handed over to the cell; otherwise, the UE cannot be handed over.

It should be noted that in this embodiment of the present invention, a process of performing cell handover decision based on the stored band information of the neighboring cell is not limited to the UE that reports the measurement report, but may be applied to another UE except the UE that reports the measurement report.

Optionally, in this embodiment of the present invention, during specific implementation, the first base station may send indication information to the UE to instruct the UE whether to report the band information of the cell. That is, before the first base station receives the measurement report reported by the UE, the method may further include the following step:

S101$a$: The first base station sends indication information, where the indication information is used to instruct the UE to report the band information of the cell.

In this embodiment of the present invention, the indication information sent by the first base station may be included in the message that is sent by the first base station to the UE and that includes the measurement configuration. The message may be RRC information such as RRC connection reconfiguration information.

Optionally, when a central physical frequency of a cell belongs to multiple bands, the first base station sends the indication information; otherwise, the first base station does not send the indication information, so as to save signaling overheads of an air interface.

Figure 2B:
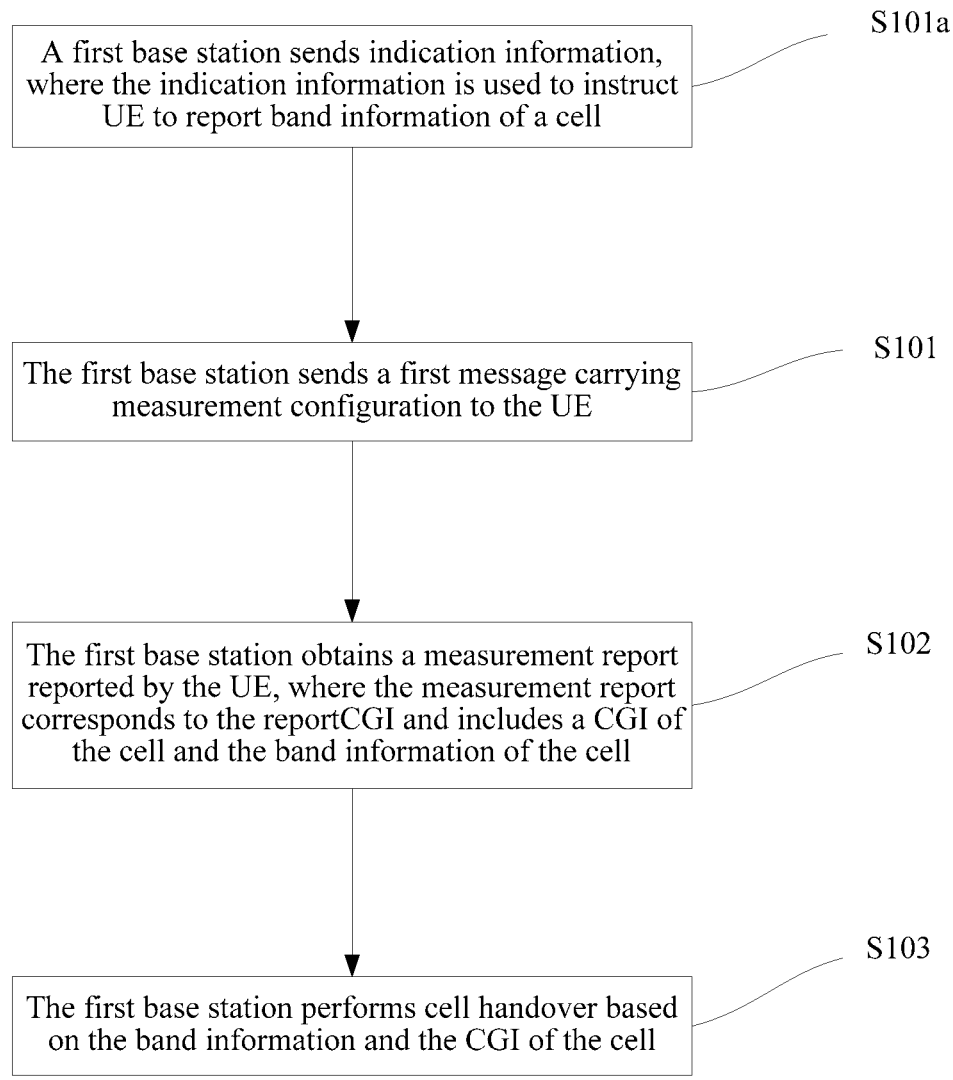

In this embodiment of the present invention, for an implementation process of S101$a$ included in the communication method, refer to FIG. 2B.

Optionally, further, whether the UE supports reporting of the band information is a capability of the UE. Therefore, before sending the indication information, the first base station may further obtain capability information reported by the UE, determine, according to the capability information, that the UE supports reporting of the band information, and when determining that the UE supports reporting of the band information, send the indication information to the UE to instruct the UE to report the band information. That is, based on FIG. 2B, the method may further include the following steps:

S101$b$: Obtain capability information reported by the UE, where the capability information is used to indicate whether the UE supports reporting of the band information of the cell.

S101$c$: Determine, according to the capability information, that the UE supports reporting of the band information of the cell.

Figure 2C:
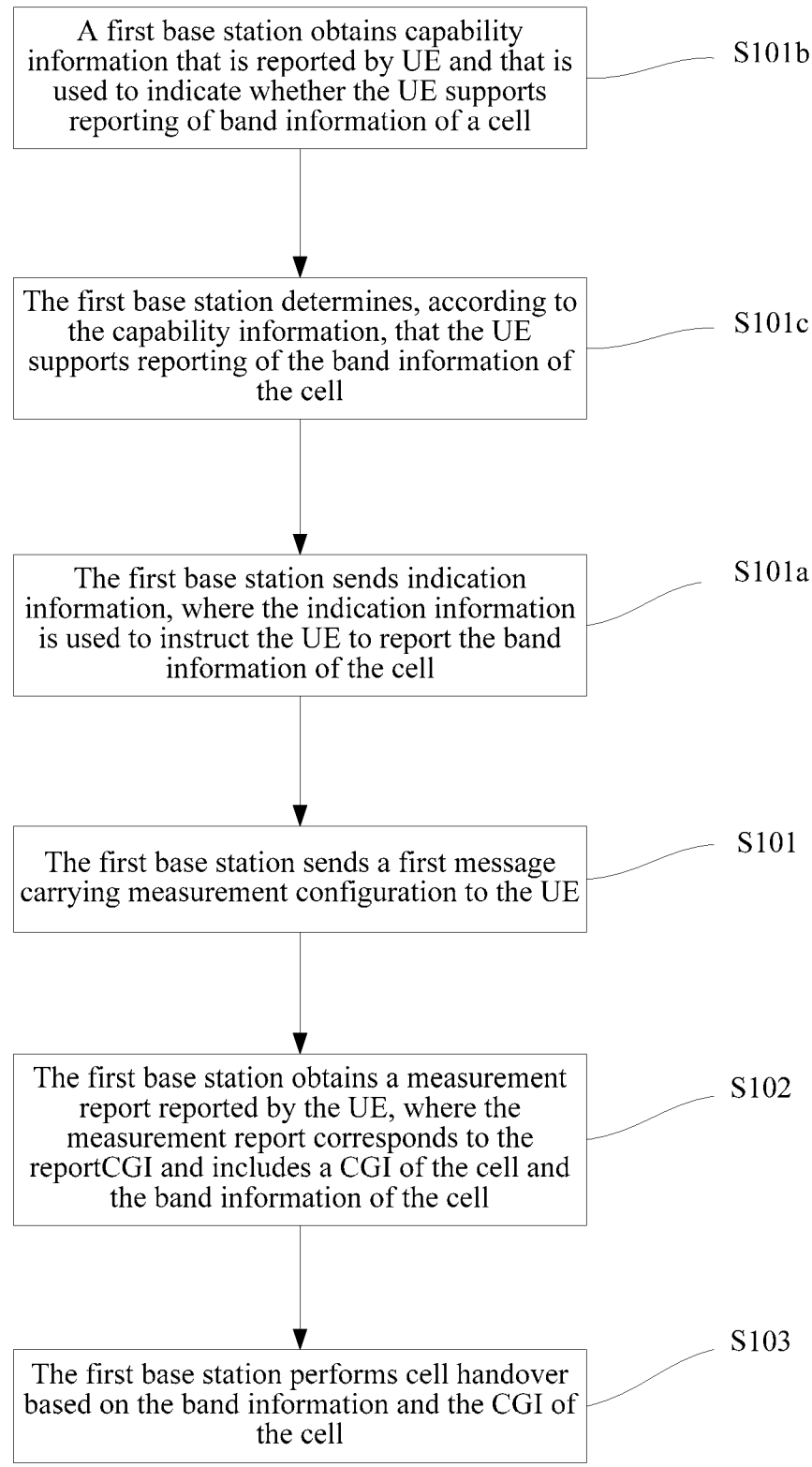

In this embodiment of the present invention, for an implementation process of S101$b$ and S101$c$ included in the communication method, refer to FIG. 2C.

In this embodiment of the present invention, a base station obtains band information of a cell, or band information and band priority information of a cell by means of reportCGI measurement, so that the base station stores complete and accurate band information of the cell. Therefore, the base station performs accurate handover decision, thereby avoiding handover failure.

During specific implementation, this embodiment of the present invention is not limited to the foregoing implementation manners. For example, in this embodiment of the present invention, a new RRC process may be defined to obtain information about a cell that is used as a neighboring cell. The base station sends a request message to the UE, where the request message is used to request to obtain band information of the cell, and the request message may include information such as an ARFCN, a PCI, and/or a CGI for designating the cell. The UE reads system information of the cell to obtain the band information, and then the UE sends a response message including the band information to the base station, so that the base station stores accurate and complete band information of the cell that is used as the neighboring cell.

When a source base station and a target base station perform handover by using an X2 interface, the source base station uses a downlink ARFCN of a target cell as a parameter to derive a key, and sends the derived key to the target base station, so that after handover is completed, the target base station communicates with the UE by using the key. The UE receives the downlink ARFCN of the target cell determined by the target base station, and derives a key based on the downlink ARFCN, so that after handover is completed, the UE communicates with the base station by using the key. The key derived by the UE and the key derived by the source base station need to be the same, and this requires that the source base station and the UE need to use the same ARFCN to derive the key. Further, when a central physical frequency of the target cell belongs to multiple bands, bands of the target cells selected by the source base station and the target base station for the UE need to be the same. Because a physical frequency channel number is determined, when the band is selected, an ARFCN is selected. In other words, downlink ARFCNs of the target cells selected by the source base station and the target base station for the UE need to be the same. Therefore, if the band information of the neighboring cell stored by the source base station is incorrect or incomplete, or the band information stored by the source base station is different from the band information stored by the target base station, a band selected by the source base station may be different from a band selected by the target base station. Consequently, the UE and the target base station use different keys, leading to handover failure. During the handover process by using the X2 interface, the source base station may derive a key for another cell, except the target cell, of the target base station. The (another) cell is used as a potential reestablishment preparation cell, so as to respond to a potential reestablishment process. A downlink ARFCN of the (another) cell may be used as a parameter for deriving a key, and a same problem also exists.

In this embodiment of the present invention, when handover is performed by using the X2 interface and a key needs to be derived for the cell (which is used as a target cell of handover, or a potential reestablishment preparation cell), the first base station may select a downlink ARFCN for the UE based on the band information of the cell or the band information and the band priority information of the cell, derive a key based on the downlink ARFCN, and send the derived key to a second base station. The second base station is a base station that sets up the X2 interface with the first base station and may be used a target base station for X2 handover, and the cell belongs to the second base station.

In this embodiment of the present invention, the first base station obtains the band information of the cell used as the target cell, or the band information and the band priority information of the cell. Therefore, the first base station used as a source base station and the second base station used as a target base station select a same band for the UE based on a same rule and the UE uses the band as a parameter to derive a key, so that derived keys are the same, thereby avoiding handover failure.

In this embodiment of the present invention, a base station obtains band information of a cell, or band information and band priority information of a cell by means of reportCGI measurement, so that the base station obtains complete and accurate band information of the cell and can perform accurate handover decision, and a band selected by a source base station is the same as a band selected by a target base station, thereby avoiding handover failure.

Currently, when two base stations set up an X2 interface, the two base stations may exchange band information of respective cells, that is, exchange ARFCNs, bands in corresponding freqBandIndicator information elements, and additional band lists in multiBandInfoList information elements of respective cells. However, when a cell belongs to multiple bands, that is, a multiBandInfoList information element is broadcast, the base stations use, according to whether a freqBandIndicatorPriority information element is broadcast, different selection mechanisms to select bands for UE, that is:

if the freqBandIndicatorPriority information element is broadcast and the UE supports the feature, a band that is indicated in the multiBandInfoList and that is supported by the UE is preferentially selected for the UE. A higher rank of a band in the multiBandInfoList indicates a higher priority of the band, that is, the first band supported by the UE in bands listed in the multiBandInfoList is selected; and if none of the bands listed in the multiBandInfoList is supported by the UE, the band indicated by the freqBandIndicator is selected; or if the freqBandIndicatorPriority is not broadcast or the UE does not support the feature, it is determined whether the UE supports the band indicated by the freqBandIndicator; if the UE supports the band indicated by the freqBandIndicator, the band indicated by the freqBandIndicator is selected; and if the UE does not support the band indicated by the freqBandIndicator, a band that is indicated in the multiBandInfoList and that is supported by the UE is selected. A higher rank of a band in the multiBandInfoList indicates a higher priority of the band, that is, the first band supported by the UE in bands listed in the multiBandInfoList is selected.

In another embodiment of the present invention, when handover is performed by using an X2 interface, in addition to the band information, the source base station and the target base station further exchange band priority information, so that when X2 handover is performed, a band selected by the source base station for the UE is the same as a band selected by the target base station, thereby avoiding handover failure.

Figure 3A:
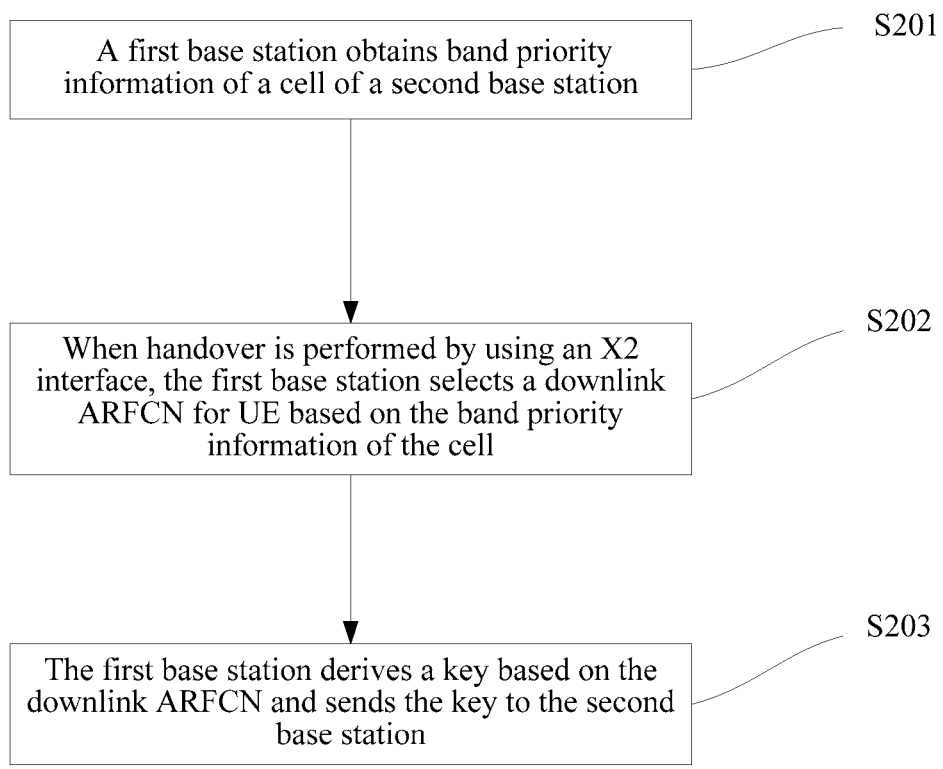
FIG. 3A is an implementation flowchart of another communication method according to an embodiment of the present invention.

FIG. 3A is an implementation flowchart of another communication method according to an embodiment of the present invention. As shown in FIG. 3A, the method includes:

S201: A first base station obtains band priority information of a cell of a second base station.

In this embodiment of the present invention, the band priority information is used to indicate whether a priority of a band in an additional band list configured for the cell is higher than priority of band configured for the cell.

In this embodiment of the present invention, the first base station and the second base station are two base stations that set up an X2 interface. An X2 setup request message may be sent by the first base station, or an X2 setup request message may be sent by the second base station.

In this embodiment of the present invention, if the X2 setup request message is sent by the first base station, the first base station may obtain the band priority information of the cell of the second base station in the following manner:

the first base station sends the X2 setup request message to the second base station; the second base station receives the X2 setup request message sent by the first base station, and sends response information of the X2 setup request message to the first base station; and the first base station receives the response information, sent by the second base station, of the X2 setup request message, where the response information includes the band priority information of the cell.

In this embodiment of the present invention, if the X2 setup request message is sent by the second base station, the first base station may obtain the band priority information of the cell of the second base station in the following manner:

the second base station sends the X2 setup request message to the first base station, where the X2 setup request message includes the band priority information of the cell; and the first base station receives the X2 setup request message sent by the second base station, where the X2 setup request message includes the band priority information of the cell.

In addition to that the band priority information of the cell is obtained by means of an X2 interface setup process, there is a possible method: An operator network configured for the second base station is configured by using globally uniform priority information, and the first base station directly uses the uniform or solidified priority information configuration. However, the method may limit flexibility.

S202: When handover is performed by using an X2 interface, the first base station selects a downlink ARFCN for UE based on the band priority information of the cell.

S203: The first base station derives a key based on the downlink ARFCN and sends the key to the second base station.

In this embodiment of the present invention, when handover is performed by using an X2 interface, in addition to band information, a source base station and a target base station further exchange band priority information, so that when X2 handover is performed, the source base station and the target base station select downlink ARFCNs for UE based on a same selection mechanism. Therefore, a band selected by the source base station for the UE is the same as a band selected by the target base station, thereby avoiding handover failure.

Figure 3B:
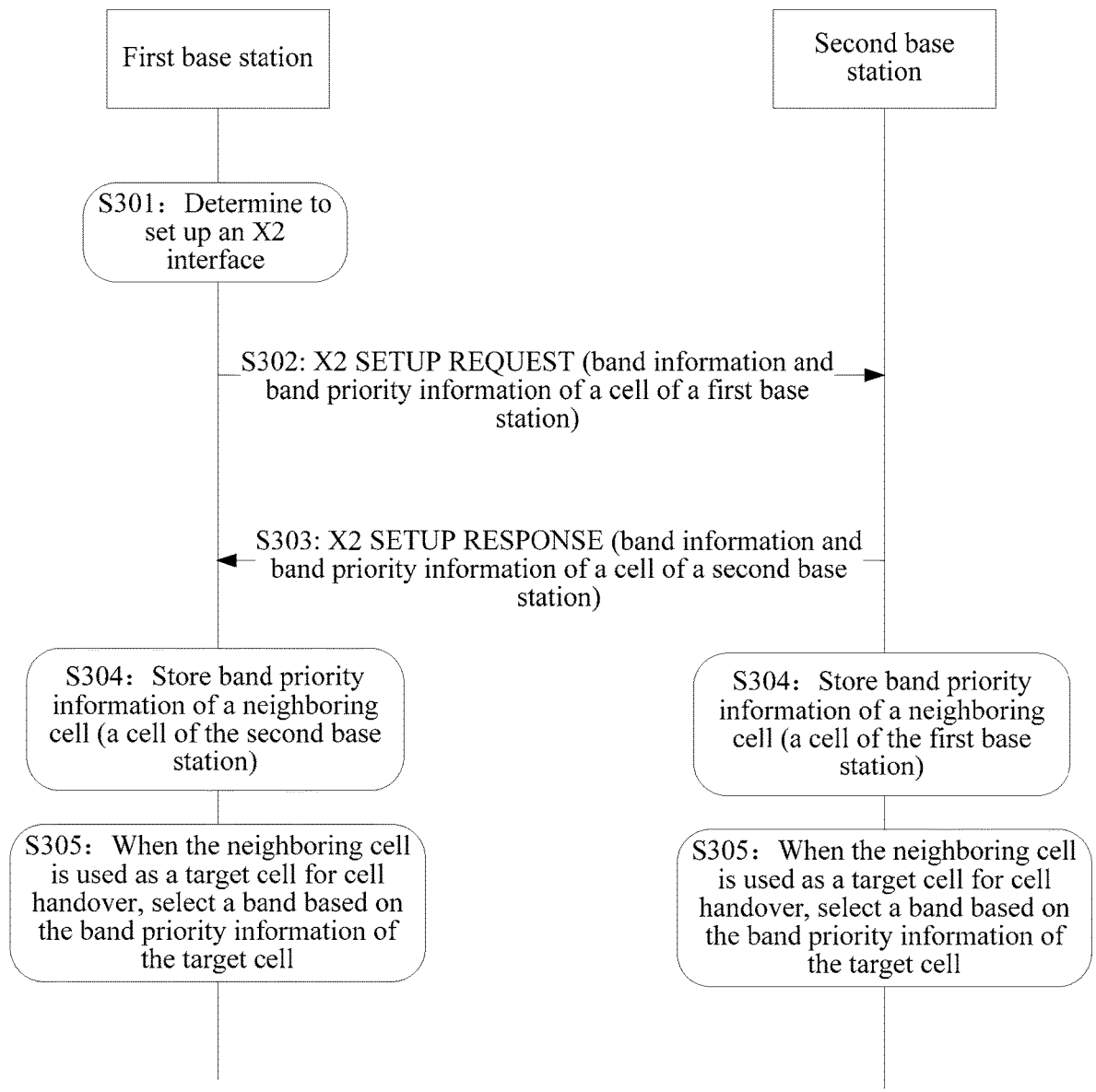
FIG. 3B is a schematic diagram of interaction between base stations according to an embodiment of the present invention.

A specific application scenario of this embodiment of the present invention is shown in FIG. 3B:

S301: A first base station recognizes a new neighboring cell, and then the first base station obtains a CGI of the newly recognized neighboring cell by delivering a measurement task of reportCGI, and determines to set up an X2 interface with a second base station.

S302: The first base station sends an X2 setup request (X2 SETUP REQUEST) message to the second base station, where the X2 SETUP REQUEST message includes band information and band priority information of a cell of the first base station.

S303: After receiving the X2 SETUP REQUEST message sent by the first base station, the second base station responds (a response to the X2 setup request) with an X2 SETUP RESPONSE message, where the X2 SETUP RESPONSE message includes band information and band priority information of a cell of the second base station.

S304: The first base station and the second base station respectively store the band priority information of cells that are used as neighboring cells of the opposite parties; and certainly, further store the band information.

S305: When the neighboring cell, that is, the cell of the second base station, is used as a target cell for cell handover, the first base station selects a band for UE based on a capability of the UE, and the band information and the band priority information of the target cell, that is, selects a downlink ARFCN, and the first base station derives a key based on the selected downlink ARFCN and sends the derived key to the second base station.

In this embodiment of the present invention, band priority information is exchanged by using an X2 interface, so that a source base station and a target base station store band information and the band priority information. Therefore, when performing band selection based on a same selection mechanism, the source base station and the target base station may select bands for UE based on the exchanged band priority information, so that a band selected by the source base station for the UE is the same as a band selected by the target base station for the UE, thereby avoiding handover failure.

It should be noted that in this embodiment of the present invention, in addition to that band information is exchanged by using an X2 interface, when configuration of an adjacent base station changes, for example, when a cell is added to the adjacent base station or band priority information of a cell of the adjacent base station changes, the adjacent base station may send base station configuration update information, so as to notify a current base station of the band priority information of the cell of the adjacent base station.

Figure 4A:
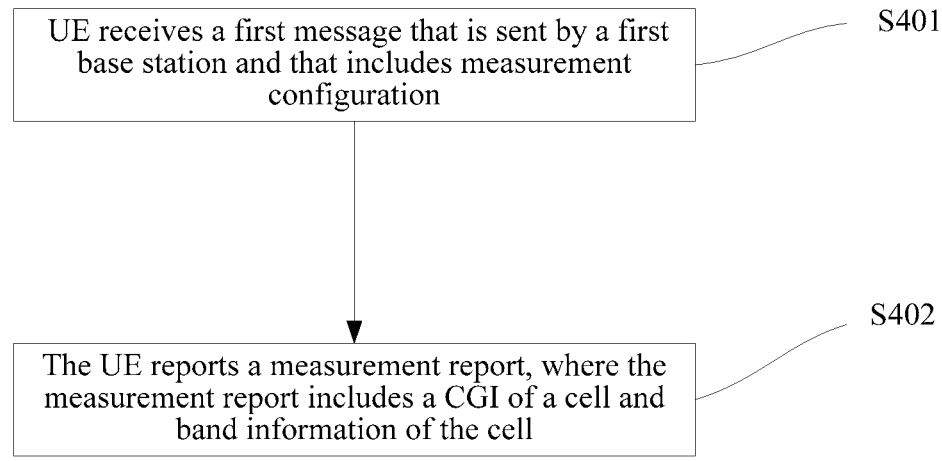
FIG. 4A to FIG. 4C are an implementation flowchart of still another communication method according to an embodiment of the present invention.

In still another embodiment of the present invention, a communication method involved in this embodiment of the present invention is described by using UE as an execution body. FIG. 4A is an implementation flowchart of still another communication method according to an embodiment of the present invention. As shown in FIG. 4A, the method includes:

S401: UE receives a message that is sent by a first base station and that includes measurement configuration.

In this embodiment of the present invention, the measurement configuration is used to request the UE to report a CGI of a cell. This embodiment of the present invention is described by using an example in which the measurement configuration is reportCGI.

S402: The UE reports a measurement report, where the measurement report includes a CGI of a cell and band information of the cell.

Optionally, in this embodiment of the present invention, before the UE reports the measurement report, the method may further include the following step:

obtaining, by the UE, the CGI of the cell and the band information of the cell, and generating the measurement report.

In this embodiment of the present invention, after receiving the message including the reportCGI, the UE performs measurement, obtains the CGI of the cell indicated by the base station, reads system information of the cell, obtains the band information of the cell, and generates the measurement report.

In this embodiment of the present invention, if one band is configured for the cell, the band information includes the band configured for the cell; and if at least two bands are configured for the cell, the band information includes the band configured for the cell and an additional band list configured for the cell.

Optionally, further, if at least two bands are configured for the cell, the measurement report further includes band priority information of the cell, and the band priority information is used to indicate whether a priority of the band in the additional band list configured for the cell is higher than priority of the band configured for the cell.

Figure 4B:
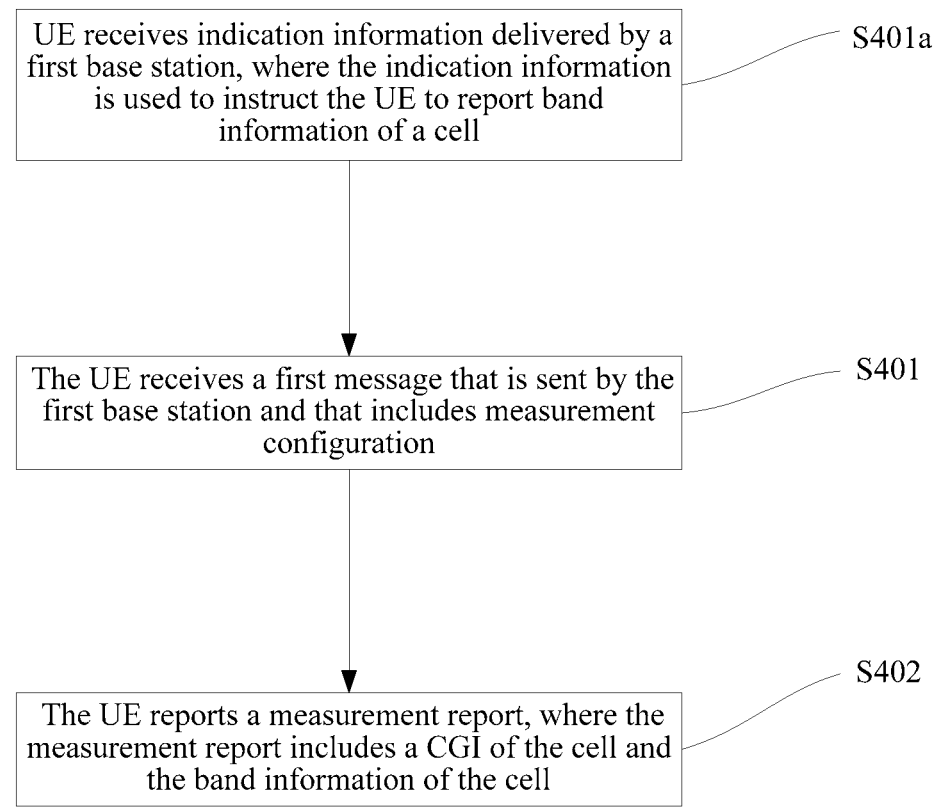

Optionally, before the UE obtains the band information of the cell, the method may further include step S401a, as shown in FIG. 4B:

S401a: The UE receives indication information sent by the first base station, where the indication information is used to instruct the UE to report the band information of the cell.

In this embodiment of the present invention, a first indication message may be included in the message, and the message may be an RRC connection reconfiguration message.

Figure 4C:
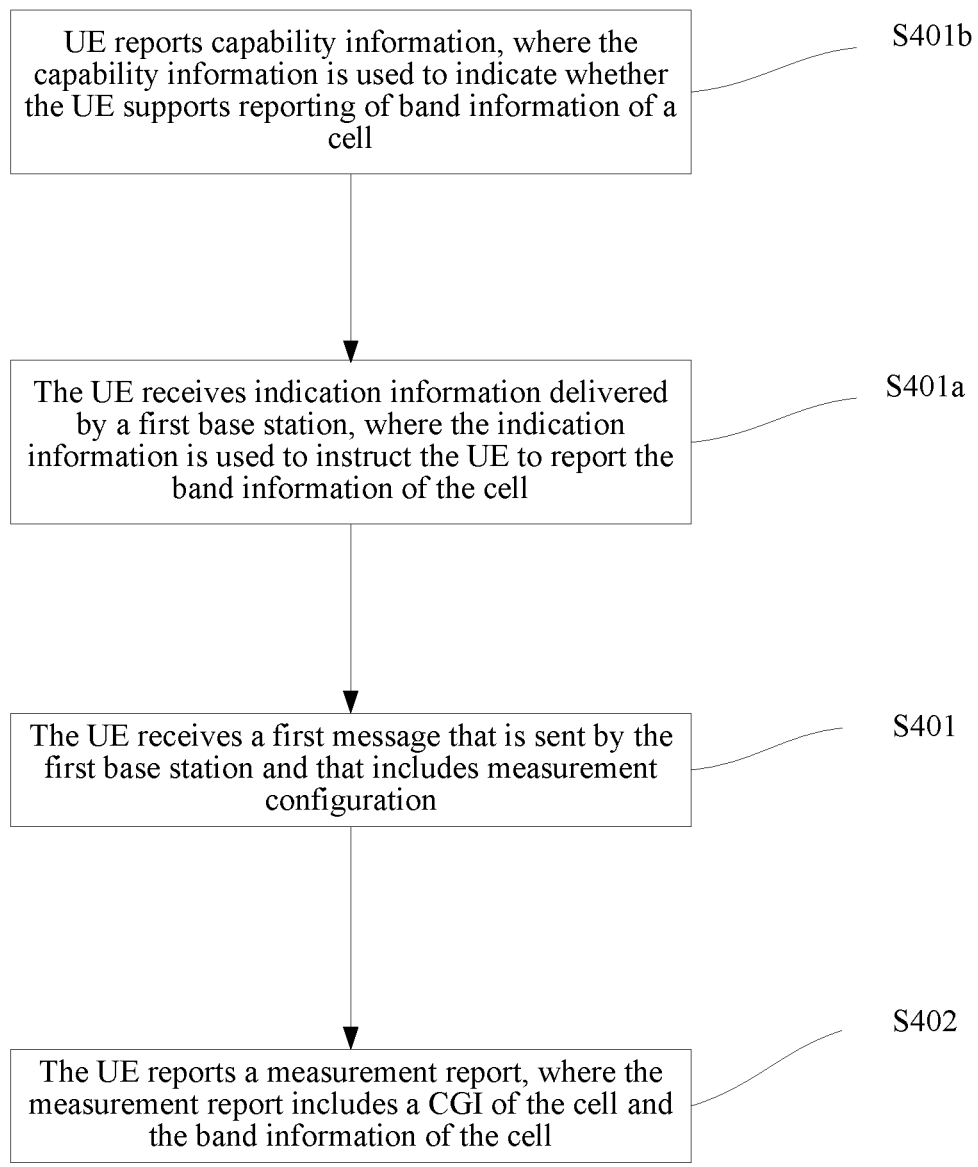

Optionally, in this embodiment of the present invention, the UE may further report capability information, that is, the method may further include step S401b, as shown in FIG. 4C:

S401b: The UE reports capability information, where the capability information is used to indicate whether the UE supports reporting of the band information of the cell.

In this embodiment of the present invention, UE reads band information of a cell based on reportCGI measurement and reports the band information to a first base station, so that the first base station obtains the band information, or the band information and band priority information of the cell by means of the reportCGI measurement. Therefore, the first base station stores complete and accurate band information of the cell, so that the first base station performs accurate handover decision, thereby avoiding handover failure.

It should be noted that in this embodiment of the present invention, for an execution process in which the UE side performs reportCGI measurement, reads the band information of the cell, and reports the measurement report including the band information of the cell to the first base station, refer to the implementation process of the method executed by the first base station, and details are not described herein.

Figure 5:
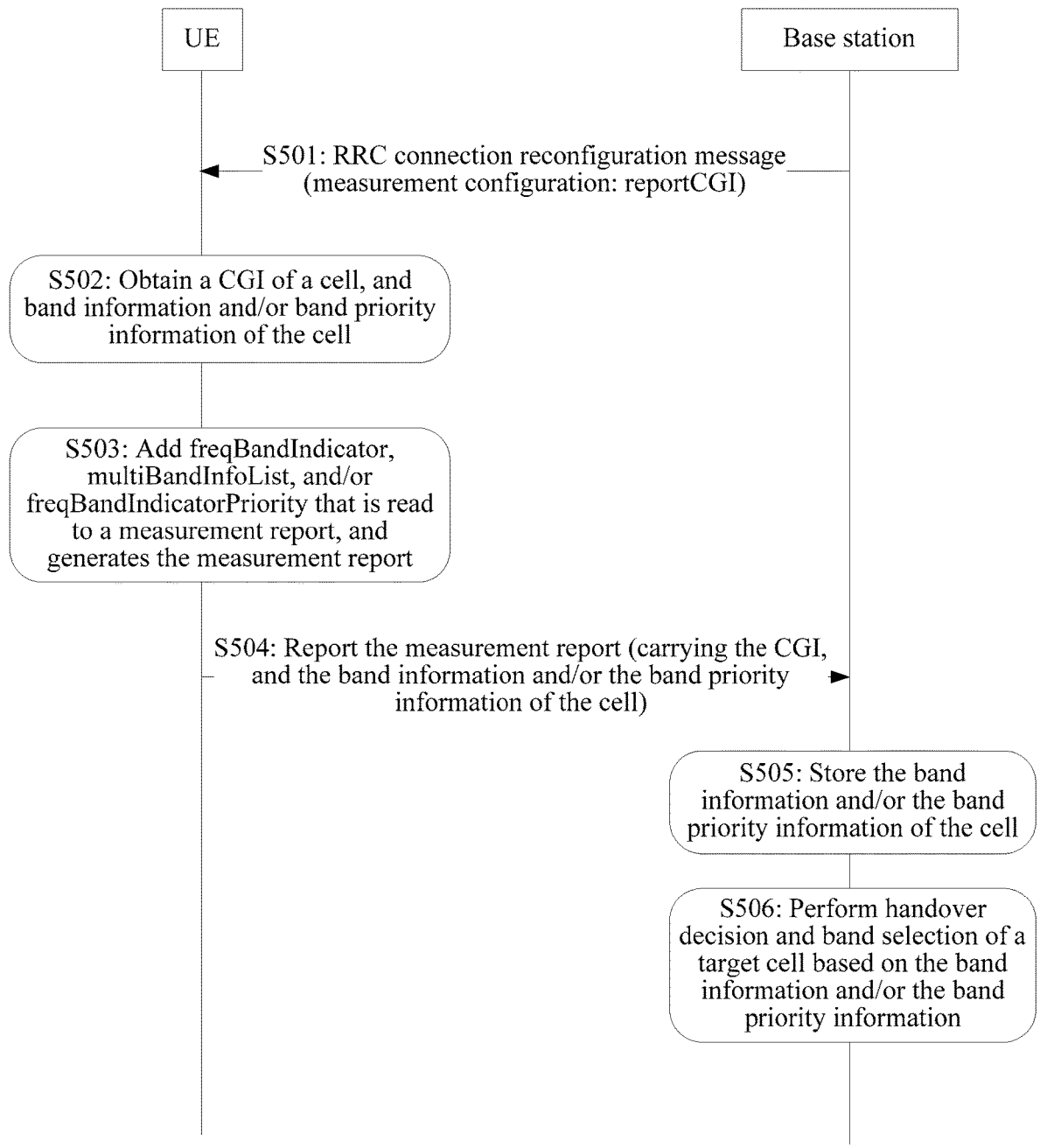
FIG. 5 is a schematic diagram of interaction between UE and a base station according to an embodiment of the present invention.

FIG. 5 is a schematic diagram of interaction between UE and a base station by using the communication method provided in the embodiments of the present invention. As shown in FIG. 5, an implementation process includes:

S501: A base station sends an RRC message to UE, where the RRC message includes measurement configuration.

In this embodiment of the present invention, if the base station recognizes a new neighboring cell, the base station sends an RRC message to the UE, where the RRC message may be an RRC connection reconfiguration message, the RRC message includes the measurement configuration, and the measurement configuration is used to request the UE to report a CGI of a designated cell. In this embodiment of the present invention, if an objective of the measurement configuration is to measure reportCGI, the measurement configuration is used to request the UE to report the CGI of the designated cell.

Optionally, in this embodiment of the present invention, the RRC message sent by the base station may include indication information, which is used to instruct the UE whether to report band information of the newly recognized neighboring cell.

Optionally, whether the UE supports reporting of the band information is a capability of the UE. Therefore, in this embodiment of the present invention, after the base station determines, according to the UE capability, that the UE supports reporting of the band information, the RRC message includes the indication information used to instruct the UE to report the band information.

S502: The UE performs measurement, obtains a CGI of a newly recognized neighboring cell, reads system information of the newly recognized neighboring cell, obtains band information and/or band priority information of the newly recognized neighboring cell, and generates a measurement report.

Specifically, the UE may read a system information block type 1 (System Information Block Type1, SIB1) of the cell to obtain the band information and/or the band priority information. If the cell belongs to only one band, a cell broadcast broadcasts only a freqBandIndicator, and the band information read by the UE includes the band configured for the cell. If the cell belongs to multiple bands, in addition to the freqBandIndicator, the cell broadcast further broadcasts an additional band list (multiBandInfoList) configured for the cell. Therefore, the band information read by the UE includes the band (freqBandIndicator) configured for the cell and the additional band list (multiBandInfoList) configured for the cell.

When the cell belongs to multiple bands, the system information of the cell may also broadcast freqBandIndicatorPriority. If the freqBandIndicatorPriority is broadcast, a priority of the band in the multiBandInfoList is higher than a priority of the band indicated by the freqBandIndicator; otherwise, the priority of the band indicated by the freqBandIndicator is higher than a priority of the band in the multiBandInfoList. Whether to broadcast the freqBandIndicatorPriority depends on a policy of an operator.

S503: The UE adds freqBandIndicator, multiBandInfoList, and/or freqBandIndicatorPriority that is read to the measurement report, and generates the measurement report.

S504: The UE reports the measurement report to the base station, where in addition to the CGI, the measurement report further includes the band information and/or the band priority information.

S505: The base station stores the obtained band information and/or band priority information related to the neighboring cell.

It should be noted that step S505 is an optional step.

S506: The base station determines, based on a capability of the UE and the band information of the neighboring cell, whether the UE can be handed over to the neighboring cell; that is, if the UE supports any band in the band information of the neighboring cell, it is considered that the UE can be handed over to the neighboring cell; otherwise, the UE cannot be handed over.

In this embodiment of the present invention, if the base station stores accurate information of the neighboring cell, subsequently, for any UE, which may be different from the UE reporting the band information, when the neighboring cell is used as a target cell to which the UE is handed over, the base station performs handover decision based on the information of the neighboring cell, and may further select a corresponding band, that is, a downlink ARFCN, for the UE, so that the UE uses the downlink ARFCN as a parameter for deriving a key.

By means of the communication method provided in this embodiment of the present invention, information of a neighboring cell obtained by a source base station is the same as information of a neighboring cell obtained by a target base station; that is, information elements freqBandIndicator, multiBandInfoList, and freqBandIndicatorPriority are obtained. Therefore, the source base station and the target base station select a same band for the UE based on a same rule, and the UE uses the band as a parameter for deriving keys. Therefore, the derived keys are the same, thereby effectively avoiding a problem of handover failure.

Figure 6:
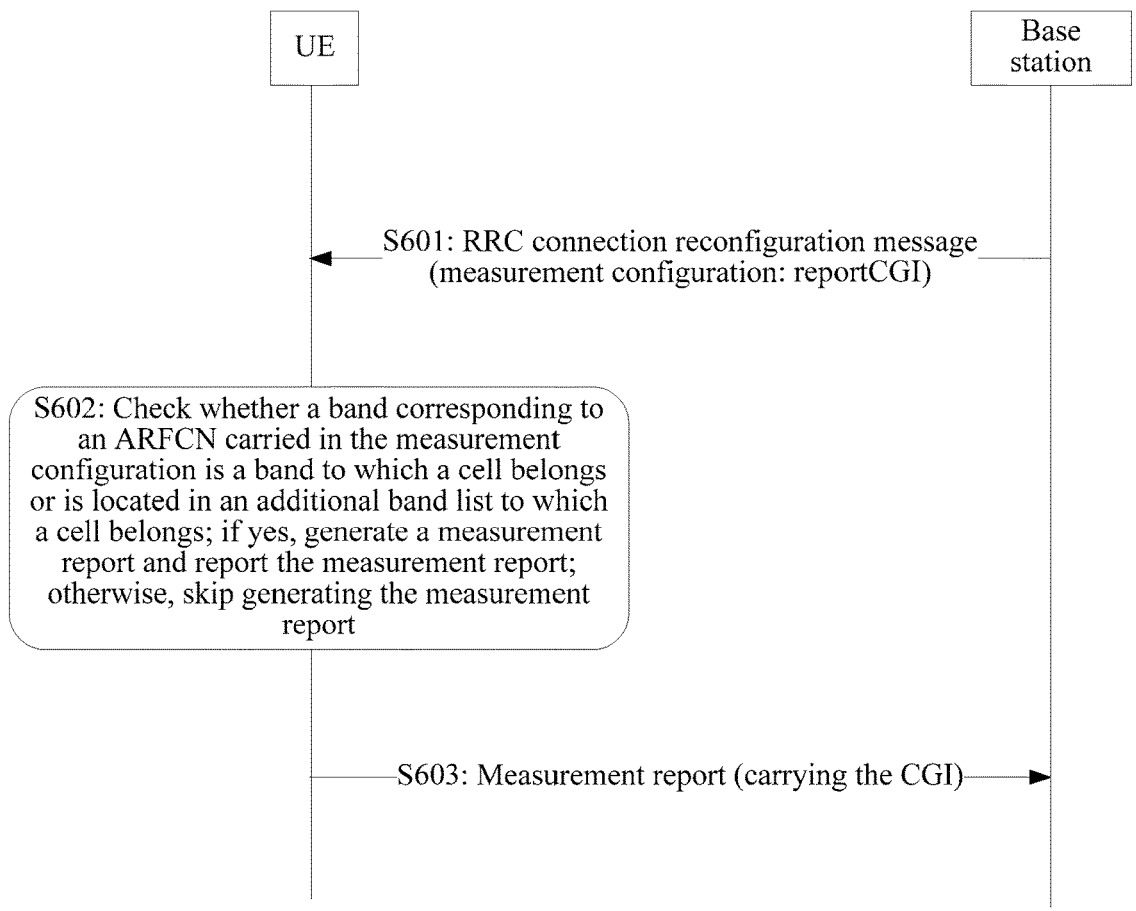
FIG. 6 is another schematic diagram of interaction between UE and a base station according to an embodiment of the present invention.

In another implementation manner of this embodiment of the present invention, when receiving measurement configuration, UE performs measurement, obtains a CGI of a cell, and checks whether a band corresponding to an ARFCN included in the measurement configuration is a band configured for the cell, or is located in an additional band list configured for the cell. If the ARFCN included in the measurement configuration does not belong to the band configured for the cell, and is not located in the additional band list configured for the cell, the UE does not report the obtained CGI of the cell, so as to avoid handover failure caused by setting up incorrect band information. An implementation process is shown in FIG. 6 and includes:

S601: A base station sends an RRC connection reconfiguration message to UE, where the RRC connection reconfiguration message includes measurement configuration reportCGI.

S602: The UE checks whether a band corresponding to an ARFCN included in the measurement configuration is a band configured for a cell or is located in an additional band list configured for a cell; if yes, the UE generates a measurement report; otherwise, the UE does not generate a measurement report.

S603: The UE sends the measurement report to the base station.

By means of the solution in this embodiment of the present invention, band information of a neighboring cell stored by a base station may be incomplete, but is correct. If the base station sets up an X2 interface with a base station of the neighboring cell, by using the method of exchanging band priority information by using the X2 interface in the foregoing embodiment, complete and correct band information may be obtained. If the base station does not set up the X2 interface with the base station of the neighboring cell, handover of UE to the neighboring cell may be reduced. However, handover failure may not be caused due to the fact that the UE does not support the band of the neighboring cell.

It should be noted that in the embodiments of the present invention, execution numbers of steps in figures do not completely limit an execution sequence of the steps, and the figures are merely for exemplary descriptions.

Figure 7A:
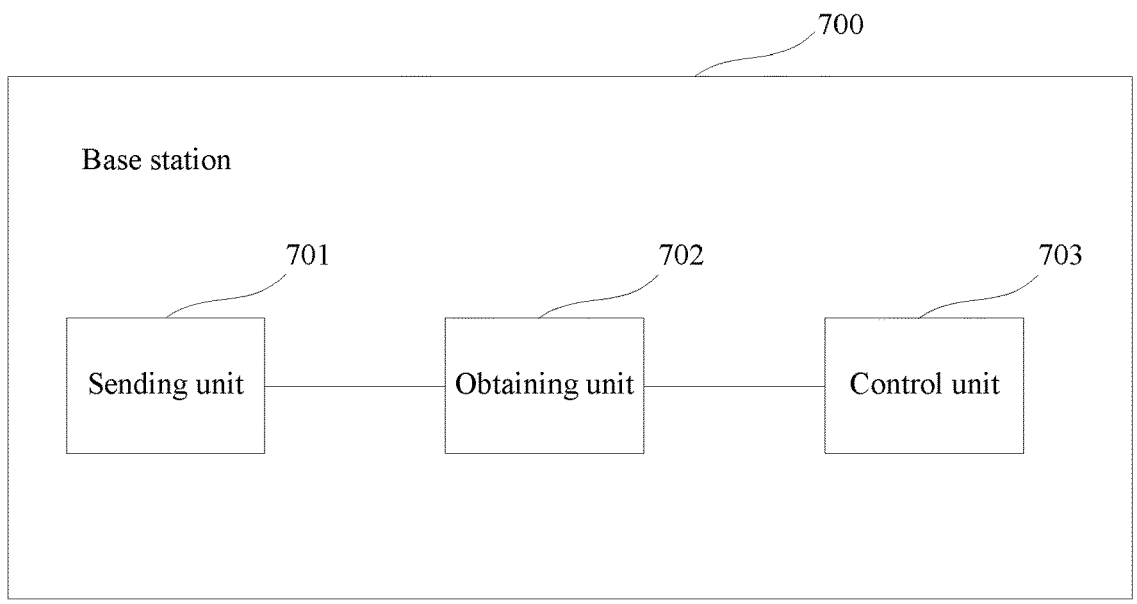
FIG. 7A and FIG. 7B each are a schematic structural diagram of a base station according to an embodiment of the present invention.

Based on the communication method provided in the foregoing embodiment of the present invention, an embodiment of the present invention provides a base station 700. FIG. 7A is a schematic structural diagram of the base station 700 according to this embodiment of the present invention. As shown in FIG. 7A, the base station 700 includes a sending unit 701, an obtaining unit 702, and a control unit 703.

The sending unit 701 is configured to send a message including measurement configuration to UE, where the measurement configuration is used to request the UE to report a CGI of a cell.

The obtaining unit 702 is configured to obtain a measurement report reported by the UE, where the measurement report corresponds to the measurement configuration sent by the sending unit, and includes the CGI of the cell and band information of the cell.

The control unit 703 is configured to perform cell handover based on the band information of the cell and the CGI of the cell that are obtained by the obtaining unit 702.

In a first implementation manner of this embodiment of the present invention, if one band is configured for the cell, the band information obtained by the obtaining unit 702 includes the band configured for the cell. If at least two bands are configured for the cell, the band information includes the band configured for the cell and an additional band list configured for the cell.

In a second implementation manner of this embodiment of the present invention, if at least two bands are configured for the cell, the measurement report obtained by the obtaining unit 702 further includes band priority information of the cell. The band priority information is used to indicate whether a priority of the band in the additional band list configured for the cell is higher than priority of the band configured for the cell.

In a third implementation manner of this embodiment of the present invention, the sending unit 701 is further configured to:

before the obtaining unit 702 obtains the measurement report reported by the UE, send indication information, where the indication information is used to instruct the UE to report the band information of the cell.

In a fourth implementation manner of this embodiment of the present invention, the obtaining unit 702 is further configured to:

before the sending unit 701 sends the indication information, obtain capability information reported by the UE, and determine, according to the capability information, that the UE supports reporting of the band information of the cell, where the capability information is used to indicate whether the UE supports reporting of the band information of the cell.

In a fifth implementation manner of this embodiment of the present invention, the indication information sent by the sending unit 701 is included in the message including the measurement configuration.

In a sixth implementation manner of this embodiment of the present invention, the message sent by the sending unit 701 is a radio resource control RRC connection reconfiguration message.

In a seventh implementation manner of this embodiment of the present invention, the control unit 703 is further configured to:

when handover is performed by using an X2 interface, select a downlink absolute radio frequency channel number ARFCN for the UE based on the band information of the cell, or the band information and the band priority information of the cell, derive a key based on the downlink ARFCN, and send the key to a second base station, where the cell belongs to the second base station.

Figure 7B:
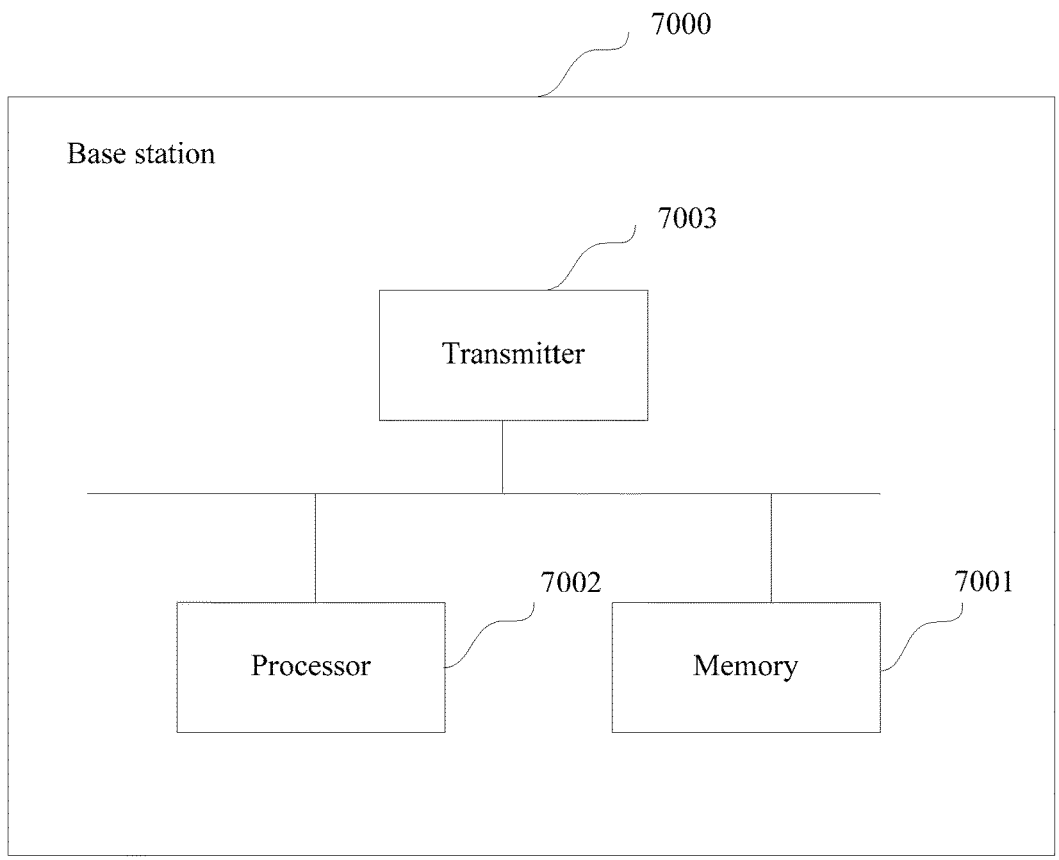

Based on the foregoing communication method and the foregoing base station that are provided in the embodiments of the present invention, an embodiment of the present invention further provides a base station 7000 configured to implement the communication method shown in FIG. 2A and FIG. 2B. FIG. 7B is a schematic structural diagram of the base station 7000 according to an embodiment of the present invention. As shown in FIG. 7B, the base station 7000 includes a memory 7001, a processor 7002, and a transmitter 7003. In this embodiment of the present invention:

The memory 7001 is configured to store program code executed by the processor 7002.

The processor 7002 is configured to invoke a program stored in the memory 7001, to send a message including measurement configuration to UE by using the transmitter 7003, where the measurement configuration is used to request the UE to report a CGI of a cell. The processor 7002 obtains a measurement report reported by the UE, where the measurement report corresponds to the measurement configuration and includes the CGI of the cell and band information of the cell. The processor 7002 stores the band information of the cell and the CGI of the cell, and performs cell handover based on the band information of the cell and the CGI of the cell.

Specifically, if one band is configured for the cell, the band information includes the band configured for the cell; and if at least two bands are configured for the cell, the band information includes the band configured for the cell and an additional band list configured for the cell.

Further, if at least two bands are configured for the cell, the measurement report further includes band priority information of the cell, and the band priority information is used to indicate whether a priority of the band in the additional band list configured for the cell is higher than priority of the band configured for the cell.

Optionally, in this embodiment of the present invention, the processor 7002 is further configured to: before obtaining the measurement report reported by the UE, send indication information by using the transmitted 7003, where the indication information is used to instruct the UE to report the band information of the cell. The indication information is included in the message, and the message is a radio resource control RRC connection reconfiguration message.

Optionally, in this embodiment of the present invention, the processor 7002 is further configured to: before sending the indication information, obtain capability information reported by the UE, where the capability information is used to indicate whether the UE supports reporting of the band information of the cell; and the processor 7002 determines, according to the capability information, that the UE supports reporting of the band information of the cell.

Optionally, the processor 7002 is further configured to: after storing the band information of the cell, when handover is performed by using an X2 interface, select a downlink ARFCN for the UE based on the band information of the cell, or the band information and the band priority information of the cell, derive a key based on the downlink ARFCN, and send the derived key to a second base station, where the cell belongs to the second base station.

In the embodiments of the present invention, the base station 700 and the base station 7000 obtain band information of a cell, or band information and band priority information of a cell by means of measurement, so that the base stations obtain complete and accurate band information of the cell. Therefore, the base stations perform accurate handover decision, thereby avoiding handover failure.

Figure 8A:
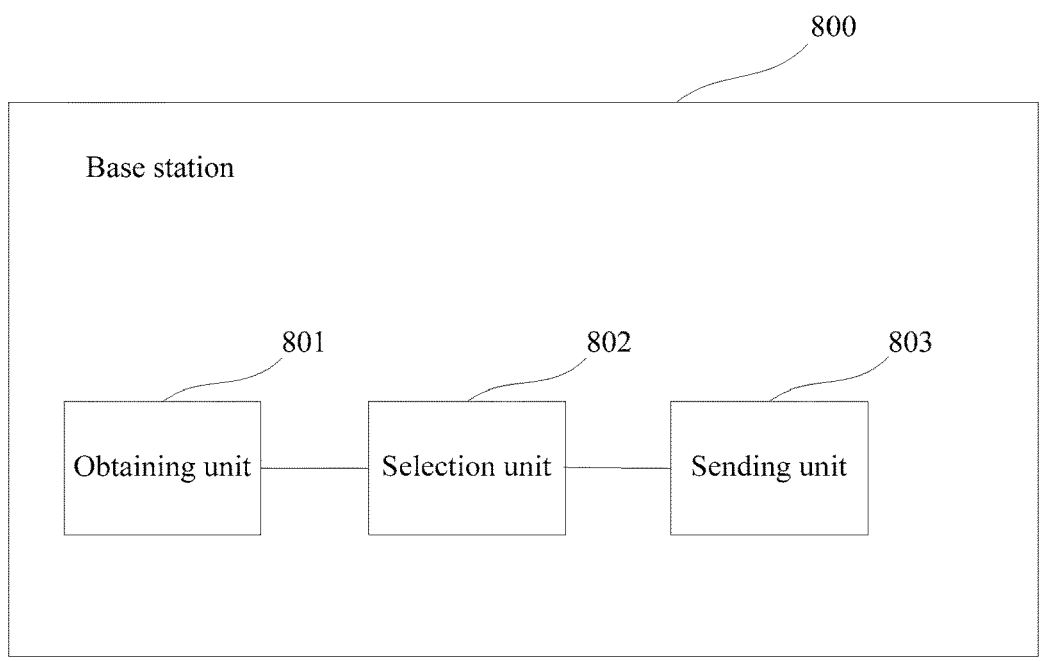
FIG. 8A and FIG. 8B each are a schematic structural diagram of another base station according to an embodiment of the present invention.

An embodiment of the present invention further provides a base station 800. FIG. 8A is a schematic structural diagram of the base station 800 according to an embodiment of the present invention. The base station 800 includes an obtaining unit 801, a selection unit 802, and a sending unit 803.

The obtaining unit 801 is configured to obtain band priority information of a cell of a second base station, where the band priority information is used to indicate whether a priority of a band in an additional band list configured for the cell is higher than priority of band configured for the cell.

The selection unit 802 is configured to: when handover is performed by using an X2 interface, select a downlink ARFCN for UE based on the band priority information of the cell.

The sending unit 803 is configured to derive a key based on the downlink ARFCN selected by the selection unit 802 and send the derived key to the second base station.

In a first implementation manner of this embodiment of the present invention, the obtaining unit 801 is specifically configured to obtain the band priority information of the cell of the second base station in the following manner:

receiving response information, sent by the second base station, of an X2 setup request message, where the response information includes the band priority information of the cell.

In a second implementation manner of this embodiment of the present invention, the obtaining unit 801 is specifically configured to obtain the band priority information of the cell of the second base station in the following manner:

receiving an X2 setup request message sent by the second base station, where the X2 setup request message includes the band priority information of the cell.

Figure 8B:
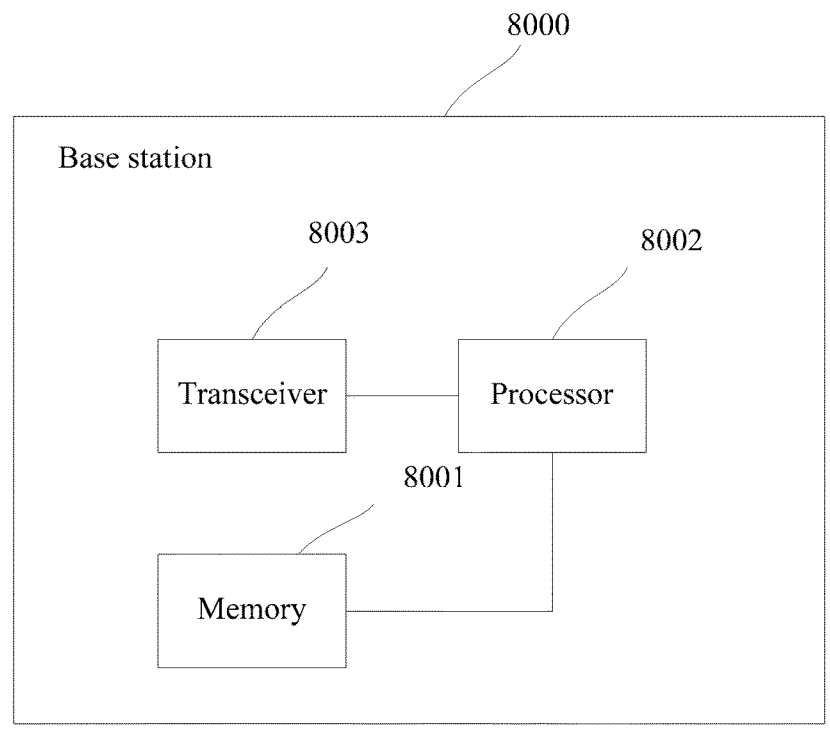

Based on the foregoing communication method and the foregoing base station that are provided in the embodiments of the present invention, an embodiment of the present invention further provides a base station 8000 configured to implement the communication method shown in FIG. 3A. FIG. 8B is a schematic structural diagram of the base station 8000 according to this embodiment of the present invention. As shown in FIG. 8B, the base station 8000 includes a memory 8001, a processor 8002, and a transceiver 8003. In this embodiment of the present invention:

The memory 8001 is configured to store program code executed by the processor 8002.

The processor 8002 is configured to: invoke a program stored in the memory 8001, to obtain band priority information of a cell of a second base station by using the transceiver 8003, where the band priority information is used to indicate whether a priority of a band in an additional band list configured for the cell is higher than priority of band configured for the cell; when handover is performed by using an X2 interface, select a downlink ARFCN for UE based on the band priority information of the cell, derive a key based on the downlink ARFCN, and send the derived key to the second base station by using the transceiver 8003.

In a first implementation manner of this embodiment of the present invention, specifically, the processor 8002 may obtain the band priority information of the cell of the second base station in the following manner:

receiving response information, sent by the second base station, of an X2 setup request message, where the response information includes the band priority information of the cell.

In another implementation manner of this embodiment of the present invention, specifically, the processor 8002 may obtain the band priority information of the cell of the second base station in the following manner:

receiving an X2 setup request message sent by the second base station, where the X2 setup request message includes the band priority information of the cell.

In the embodiments of the present invention, when handover is performed by using an X2 interface, in addition to band information, the base station 800 and the base station 8000 further exchange band priority information, so that when X2 handover is performed, a source base station and a target base station select downlink ARFCNs for UE based on a same selection mechanism. Therefore, a band selected by the source base station for the UE is the same as a band selected by the target base station, thereby avoiding handover failure.

Figure 9A:
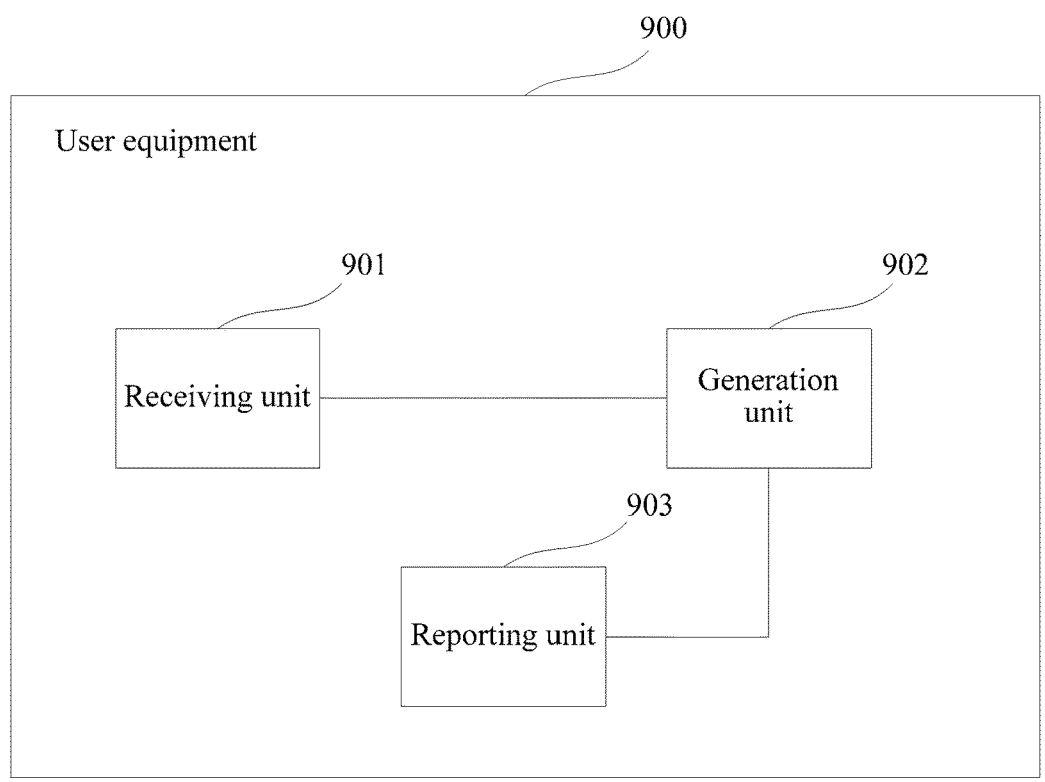
FIG. 9A and FIG. 9B each are a schematic structural diagram of user equipment according to an embodiment of the present invention.

Still another embodiment of the present invention further provides user equipment 900. FIG. 9A is a schematic structural diagram of the user equipment 900 according to this embodiment of the present invention. As shown in FIG. 9A, the user equipment 900 includes a receiving unit 901, a generation unit 902, and a reporting unit 903.

The receiving unit 901 is configured to receive a message that is sent by a first base station and that includes reportCGI, where the reportCGI is used to request the UE to report a CGI of a cell.

The generation unit 902 is configured to obtain the CGI of the cell and band information of the cell, and generate a measurement report corresponding to the reportCGI.

The reporting unit 903 is configured to report the measurement report generated by the generation unit 902, where the measurement report includes the CGI of the cell and the band information of the cell.

Specifically, in this embodiment of the present invention, if one band is configured for the cell, the band information includes the band configured for the cell; and if at least two bands are configured for the cell, the band information includes the band configured for the cell and an additional band list configured for the cell.

Further, if at least two bands are configured for the cell, the measurement report further includes band priority information of the cell, and the band priority information is used to indicate whether a priority of the band in the additional band list configured for the cell is higher than priority of the band configured for the cell.

In an implementation manner of this embodiment of the present invention, the receiving unit 901 is further configured to:

before the generation unit 902 obtains the band information of the cell, receive indication information sent by the first base station, where the indication information is used to instruct the UE to report the band information of the cell.

Optionally, a first indication message is included in the message, and the message is a radio resource control RRC connection reconfiguration message.

In another implementation manner of this embodiment of the present invention, the reporting unit 903 is further configured to:

report capability information, where the capability information is used to indicate whether the UE supports reporting of the band information of the cell.

Figure 9B:
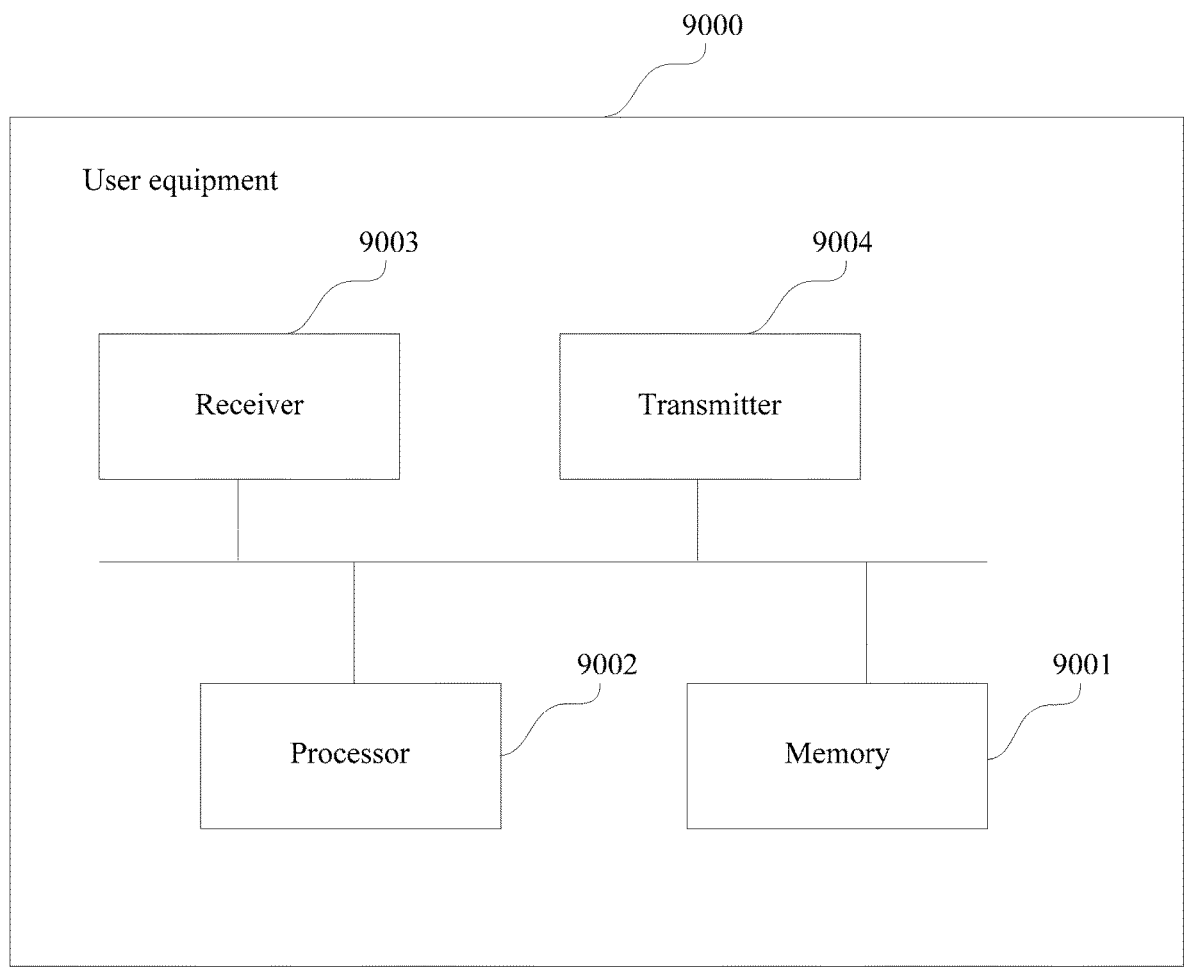

An embodiment of the present invention further provides user equipment 9000. As shown in FIG. 9B, the user equipment 9000 includes a memory 9001, a processor 9002, a receiver 9003, and a transmitter 9004. In this embodiment of the present invention:

The memory 9001 is configured to store program code executed by the processor 9002.

The processor 9002 is configured to invoke a program stored by the memory 9001, to receive, by using the receiver 9003, a message that is sent by a first base station and that includes measurement configuration, where the measurement configuration is used to request the UE to report a CGI of a cell. The processor 9002 obtains the CGI of the cell and band information of the cell, and generates a measurement report corresponding to the measurement configuration. The processor 9002 reports the measurement report by using the transmitter 9004, where the measurement report includes the CGI of the cell and the band information of the cell.

In this embodiment of the present invention, if one band is configured for the cell, the band information includes the band configured for the cell; and if at least two bands are configured for the cell, the band information includes the band configured for the cell and an additional band list configured for the cell.

Further, if at least two bands are configured for the cell, the measurement report further includes band priority information of the cell, and the band priority information is used to indicate whether a priority of the band in the additional band list configured for the cell is higher than priority of the band configured for the cell.

In an implementation manner of this embodiment of the present invention, the processor 9002 is further configured to: before obtaining the band information of the cell, receive, by using the receiver 9003, indication information sent by the first base station, where the indication information is used to instruct the UE to report the band information of the cell. A first indication message is included in the message, and the message is a radio resource control RRC connection reconfiguration message.

In another implementation manner of this embodiment of the present invention, the processor 9002 is further configured to report capability information by using the transmitter 9004, and the capability information is used to indicate whether the UE supports reporting of the band information of the cell.

In the embodiments of the present invention, user equipment 900 and user equipment 9000 perform measurement based on measurement configuration, read band information of a cell, and report the band information to a base station, so that the base station obtains the band information of the cell, or the band information and band priority information of the cell. Therefore, the base station stores complete and accurate band information of the cell, so that the base station performs accurate handover decision, thereby avoiding handover failure.

It should be noted that the memory involved in the foregoing embodiments of the present invention may be, but is not limited to, a read-only memory (English: Read-Only Memory, ROM for short), a random access memory (English: Random Access Memory, RAM for short), an electrically erasable programmable read-only memory (English: Electrically Erasable Programmable Read-Only Memory, EEPROM for short), a disk storage medium or other disk storage, or any other medium that can be used to carry or store expected program code in a command or data structure form and can be accessed by a computer. For example, the memory may be a combination of the foregoing memories.

The processor involved in the embodiments of the present invention may be a general central processing unit.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory (non-transitory) medium, such as a random-access memory, read-only memory, a flash memory, a hard disk, a solid state drive, a magnetic tape (magnetic tape), a floppy disk (floppy disk), an optical disc (optical disc), or any combination thereof.

The present invention is described with reference to flowcharts and block diagrams of the method and the device in the embodiments of the present invention. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for reporting cell information, comprising:
receiving, by an apparatus, a measurement configuration message from a network device, wherein the measurement configuration message instructs the apparatus to send a measurement report of one cell to the network device; and
sending, by the apparatus, the measurement report of the one cell to the network device,
wherein the measurement report of the one cell comprises a cell global identifier of the one cell and frequency band information of the one cell,
wherein the frequency band information of the one cell comprises information of all frequency bands of the one cell, and the all frequency bands of the one cell comprise a first frequency band of the one cell and a list of one or more additional frequency bands of the one cell.

2. The method according to claim 1, further comprising:
receiving, by the apparatus, frequency band priority information of the one cell;
wherein the measurement report of the one cell further comprises the frequency band priority information of the one cell,
wherein the frequency band priority information of the one cell indicates that priorities of the one or more additional frequency bands of the one cell are higher than priority of the first frequency band of the one cell.

3. The method according to claim 1, further comprising:
receiving, by the apparatus, indication information from the network device,
wherein the indication information instructs the apparatus to obtain the frequency band information of the one cell.

4. An apparatus, comprising:
a receiver and a transmitter;
wherein the receiver is configured to:
receive a measurement configuration message from a network device, wherein the measurement configuration message instructs the apparatus to send a measurement report of one cell to the network device; and
wherein the transmitter is configured to:
send the measurement report of the one cell to the network device, wherein the measurement report of the one cell comprises a cell global identifier of the one cell and frequency band information of the one cell, wherein the frequency band information of the one cell comprises information of all frequency bands of the one cell, and the all frequency bands of the one cell comprise a first frequency band of the one cell and a list of one or more additional frequency bands of the one cell.

5. The apparatus according to claim 4, wherein the receiver isfurther configured to:

receive frequency band priority information of the one cell;

wherein the measurement report of the one cell further comprises the frequency band priority information of the one cell, wherein the frequency band priority information of the one cell indicates that priorities of the one or more additional frequency bands of the one cell are higher than priority of the first frequency band of the one cell.

6. The apparatus according to claim 4, wherein the receiver is further configured to:

receive indication information from the network device, wherein the indication information instructs the apparatus to obtain the frequency band information of the one cell.

7. The method according to claim 1, wherein a central physical frequency of the one cell is within a frequency range of each of the frequency bands of the one cell.

8. The apparatus according to claim 4, wherein a central physical frequency of the one cell is within a frequency range of each of the frequency bands of the one cell.

* * * * *

UNITED STATES PATENT AND TRADEMARK OFFICE
CERTIFICATE OF CORRECTION

| | |
|---|---|
| PATENT NO. | : 10,856,200 B2 |
| APPLICATION NO. | : 15/720739 |
| DATED | : December 1, 2020 |
| INVENTOR(S) | : Zhang et al. |

It is certified that error appears in the above-identified patent and that said Letters Patent is hereby corrected as shown below:

In the Claims

In Column 25, in Claim 5, Line 11, rewrite "isfurther" as -- is further --.

Signed and Sealed this
Fourth Day of October, 2022

Katherine Kelly Vidal
*Director of the United States Patent and Trademark Office*